US010012995B2

United States Patent
Kojo et al.

(10) Patent No.: US 10,012,995 B2
(45) Date of Patent: *Jul. 3, 2018

(54) AUTONOMOUS VEHICLE ROUTING AND NAVIGATION USING PASSENGER DOCKING LOCATIONS

(71) Applicant: Nissan North America, Inc., Franklin, TN (US)

(72) Inventors: Naoki Kojo, Sunnyvale, CA (US); Siddharth Kumar Thakur, Milpitas, CA (US); Nicolas Meuleau, San Francisco, CA (US); Daisuke Saito, Sunnyvale, CA (US); Nikhil Lele, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/268,834

(22) Filed: Sep. 19, 2016

(65) Prior Publication Data

US 2017/0003687 A1 Jan. 5, 2017

Related U.S. Application Data

(63) Continuation of application No. 14/597,496, filed on Jan. 15, 2015, now Pat. No. 9,448,559.

(51) Int. Cl.
*G01C 22/00* (2006.01)
*G05D 1/02* (2006.01)
(Continued)

(52) U.S. Cl.
CPC ........... *G05D 1/0225* (2013.01); *B60N 2/002* (2013.01); *G01C 21/34* (2013.01);
(Continued)

(58) Field of Classification Search
CPC .... G05D 1/0225; G05D 1/0088; G01C 21/34; G01C 21/3407; G08G 1/14; G08G 1/146; G08G 1/20; G08G 1/202
(Continued)

(56) References Cited

U.S. PATENT DOCUMENTS

| 4,656,950 A | 4/1987 | Rhoton |
| 5,910,782 A | 6/1999 | Schmitt et al. |

(Continued)

FOREIGN PATENT DOCUMENTS

| EP | 2568310 A2 | 3/2013 |
| JP | 2013182551 A | 9/2013 |
| WO | 2013169182 A1 | 11/2013 |

*Primary Examiner* — Thomas G Black
*Assistant Examiner* — Luat T Huynh
(74) *Attorney, Agent, or Firm* — Young Basile Hanlon & MacFarlane, P.C.

(57) ABSTRACT

A method and apparatus for autonomous vehicle routing and navigation using passenger docking locations are disclosed. Autonomous vehicle routing and navigation using passenger docking locations may include an autonomous vehicle identifying map information representing a vehicle transportation network, the vehicle transportation network including a primary destination and a docking location, wherein identifying the map information includes identifying the map information such that the map information includes docking location information representing the docking location. The autonomous vehicle may identify the docking location as a target docking location for the primary destination based on the map information, generate, based on the map information, route information representing a route for the autonomous vehicle to traverse the vehicle transportation network from an origin in the vehicle transportation network to the target docking location, and traverse the vehicle transportation network from the origin to the target docking location in accordance with the route information.

20 Claims, 24 Drawing Sheets

(51) Int. Cl.
*G08G 1/14* (2006.01)
*B60N 2/00* (2006.01)
*G08G 1/00* (2006.01)
*G01C 21/34* (2006.01)
*G05D 1/00* (2006.01)
*G06Q 10/04* (2012.01)

(52) U.S. Cl.
CPC ....... *G01C 21/3407* (2013.01); *G05D 1/0088* (2013.01); *G06Q 10/047* (2013.01); *G08G 1/14* (2013.01); *G08G 1/146* (2013.01); *G08G 1/20* (2013.01); *G08G 1/202* (2013.01)

(58) Field of Classification Search
USPC ..................................... 701/23–25, 408, 468
See application file for complete search history.

(56) References Cited

U.S. PATENT DOCUMENTS

| | | |
|---|---|---|
| 6,308,133 B1 | 10/2001 | Loffert et al. |
| 6,438,472 B1 | 8/2002 | Tano et al. |
| 6,640,188 B2 | 10/2003 | Hashida |
| 7,516,010 B1 | 4/2009 | Kaplan et al. |
| 7,783,421 B2 | 8/2010 | Arai et al. |
| 8,024,112 B2 | 9/2011 | Krumm et al. |
| 8,452,771 B2 | 5/2013 | Kurciska et al. |
| 8,566,029 B1 | 10/2013 | Lopatenko et al. |
| 8,606,492 B1 | 12/2013 | Botnen |
| 8,634,980 B1 | 1/2014 | Urmson et al. |
| 8,655,588 B2 | 2/2014 | Wong et al. |
| 8,694,232 B2 | 4/2014 | Kona et al. |
| 8,768,539 B1 | 7/2014 | Clement et al. |
| 8,896,685 B2 | 11/2014 | Ihara et al. |
| 9,058,703 B2 | 6/2015 | Ricci |
| 9,151,628 B1 | 10/2015 | Saito et al. |
| 9,418,491 B2 | 8/2016 | Phillips |
| 2005/0071082 A1 | 3/2005 | Ohmura et al. |
| 2006/0184013 A1 | 8/2006 | Emanuel et al. |
| 2008/0109127 A1 | 5/2008 | Ozaki |
| 2009/0030885 A1 | 1/2009 | DePasquale et al. |
| 2009/0125174 A1 | 5/2009 | Delean |
| 2009/0174540 A1 | 7/2009 | Smith |
| 2010/0106356 A1* | 4/2010 | Trepagnier ............ G01S 17/023 701/25 |
| 2010/0109445 A1 | 5/2010 | Kurs et al. |
| 2010/0256836 A1 | 10/2010 | Mudalige |
| 2010/0256908 A1 | 10/2010 | Shimshoni et al. |
| 2011/0106429 A1 | 5/2011 | Poppen et al. |
| 2012/0089326 A1 | 4/2012 | Bouve |
| 2012/0256588 A1 | 10/2012 | Hayashi et al. |
| 2012/0271778 A1 | 10/2012 | Atkins et al. |
| 2012/0303254 A1 | 11/2012 | Kirsch et al. |
| 2013/0060461 A1 | 3/2013 | Wong et al. |
| 2013/0073112 A1 | 3/2013 | Phelan et al. |
| 2013/0073114 A1 | 3/2013 | Nemat-Nasser et al. |
| 2013/0211699 A1 | 8/2013 | Scharmann et al. |
| 2013/0211705 A1 | 8/2013 | Geelen et al. |
| 2013/0231824 A1 | 9/2013 | Wilson et al. |
| 2013/0325208 A1 | 12/2013 | Osagawa et al. |
| 2013/0344856 A1 | 12/2013 | Silver et al. |
| 2014/0036076 A1 | 2/2014 | Nerayoff et al. |
| 2014/0058634 A1 | 2/2014 | Wong et al. |
| 2014/0113619 A1 | 4/2014 | Tibbitts et al. |
| 2014/0180727 A1 | 6/2014 | Freiberger et al. |
| 2014/0236719 A1 | 8/2014 | Szostak et al. |
| 2014/0285361 A1 | 9/2014 | Tippelhofer et al. |
| 2014/0320318 A1 | 10/2014 | Victor et al. |
| 2014/0350853 A1* | 11/2014 | Proux ................. G01C 21/34 701/533 |
| 2015/0039366 A1 | 2/2015 | Haque |
| 2015/0039391 A1 | 2/2015 | Hershkovitz et al. |
| 2015/0106010 A1 | 4/2015 | Martin et al. |
| 2015/0134185 A1* | 5/2015 | Lee ................. B62D 15/0285 701/26 |
| 2015/0141043 A1 | 5/2015 | Abramson et al. |
| 2015/0237662 A1 | 8/2015 | Fischer |
| 2015/0248131 A1 | 9/2015 | Fairfield et al. |
| 2015/0248689 A1 | 9/2015 | Paul et al. |
| 2015/0319093 A1 | 11/2015 | Stolfus |
| 2015/0346718 A1 | 12/2015 | Stenneth |
| 2015/0377635 A1 | 12/2015 | Beaurepaire et al. |
| 2016/0003636 A1 | 1/2016 | Ng-Thow-Hing et al. |
| 2016/0047660 A1 | 2/2016 | Fausten |
| 2016/0055419 A1 | 2/2016 | Fischer et al. |
| 2016/0071333 A1 | 3/2016 | Haidar et al. |
| 2016/0125673 A1 | 5/2016 | Bromham et al. |
| 2016/0144865 A1 | 5/2016 | Stadler |
| 2016/0247095 A1 | 8/2016 | Scicluna et al. |
| 2016/0253707 A1 | 9/2016 | Momin et al. |

* cited by examiner

AUTONOMOUS VEHICLE ROUTING AND NAVIGATION USING PASSENGER DOCKING LOCATIONS

CROSS-REFERENCE TO RELATED APPLICATION

This application is a continuation of U.S. patent application Ser. No. 14/597,496, filed on Jan. 15, 2015, now U.S. Pat. No. 9,448,559, the entire content of which is incorporated herein in its entirety by reference.

TECHNICAL FIELD

This disclosure relates to autonomous vehicle routing and navigation.

BACKGROUND

An autonomous vehicle may be controlled autonomously, without direct human intervention, to traverse a route of travel from an origin to a destination. An autonomous vehicle may include a control system that may generate and maintain the route of travel and may control the autonomous vehicle to traverse the route of travel. Accordingly, a method and apparatus for autonomous vehicle routing and navigation using passenger docking locations may be advantageous.

SUMMARY

Disclosed herein are aspects, features, elements, implementations, and embodiments of autonomous vehicle routing and navigation using passenger docking locations.

An aspect of the disclosed embodiments is an autonomous vehicle for autonomous vehicle routing and navigation using passenger docking locations. The autonomous vehicle may include a processor configured to execute instructions stored on a non-transitory computer readable medium to identify map information representing a vehicle transportation network, the vehicle transportation network including a primary destination and a docking location, wherein identifying the map information includes identifying the map information such that the map information includes docking location information representing the docking location. The processor may be configured to execute instructions stored on a non-transitory computer readable medium to identify the docking location as a target docking location for the primary destination based on the map information, and generate, based on the map information, route information representing a route for the autonomous vehicle to traverse the vehicle transportation network from an origin in the vehicle transportation network to the target docking location. The autonomous vehicle may include a trajectory controller configured to operate the autonomous vehicle in accordance with the route information such that the autonomous vehicle traverses the vehicle transportation network from the origin to the target docking location.

Another aspect of the disclosed embodiments is an autonomous vehicle for autonomous vehicle routing and navigation using passenger docking locations. The autonomous vehicle may include a processor configured to execute instructions stored on a non-transitory computer readable medium to identify map information representing a vehicle transportation network, the vehicle transportation network including a primary destination and a docking location, wherein identifying the map information includes identifying the map information such that the map information includes docking location information representing the docking location, wherein the docking location information is based on operating information for a plurality of vehicles, wherein the operating information includes a plurality of operations, wherein each operation from the plurality of operations is associated with a respective vehicle from the plurality of vehicles, wherein the docking location information is determined based on the operating information by filtering the operating information, wherein filtering the operating information includes identifying an operation from the plurality of operations as a candidate docking operation on a condition that a stationary period associated with the operation exceeds a minimum docking duration and a maximum docking duration exceeds the stationary period. The processor may be configured to execute instructions stored on a non-transitory computer readable medium to identify the docking location as a target docking location for the primary destination based on the map information, and generate, based on the map information, route information representing a route for the autonomous vehicle to traverse the vehicle transportation network from an origin in the vehicle transportation network to the target docking location. The autonomous vehicle may include a trajectory controller configured to operate the autonomous vehicle in accordance with the route information such that the autonomous vehicle traverses the vehicle transportation network from the origin to the target docking location.

Another aspect of the disclosed embodiments is an autonomous vehicle for autonomous vehicle routing and navigation using passenger docking locations. The autonomous vehicle may include a processor configured to execute instructions stored on a non-transitory computer readable medium to identify map information representing a vehicle transportation network, the vehicle transportation network including a primary destination and a first docking location, wherein identifying the map information includes identifying the map information such that the map information includes docking location information representing the first docking location. The processor may be configured to execute instructions stored on a non-transitory computer readable medium to identify the first docking location as a target docking location for the primary destination based on the map information, generate, based on the map information, first route information representing a first route for the autonomous vehicle to traverse the vehicle transportation network from an origin in the vehicle transportation network to the target docking location. identify, based on the map information, information representing a secondary destination in the vehicle transportation network, wherein the secondary destination is a parking area associated with the primary destination, and generate, based on the map information, second route information representing a second route for the autonomous vehicle to traverse the vehicle transportation network from the target docking location to the secondary destination. The autonomous vehicle may include a trajectory controller configured to operate the autonomous vehicle in accordance with the first route information such that the autonomous vehicle traverses the vehicle transportation network from the origin to the target docking location, in response to the autonomous vehicle arriving at the target docking location, operate the autonomous vehicle such that the autonomous vehicle performs a docking operation at the target docking location, and in response to performing the docking operation at the target docking location, operate the autonomous vehicle in accordance with the second route information such that the autonomous vehicle traverses the vehicle transportation network from the target docking location to the secondary destination and parks at the secondary destination.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
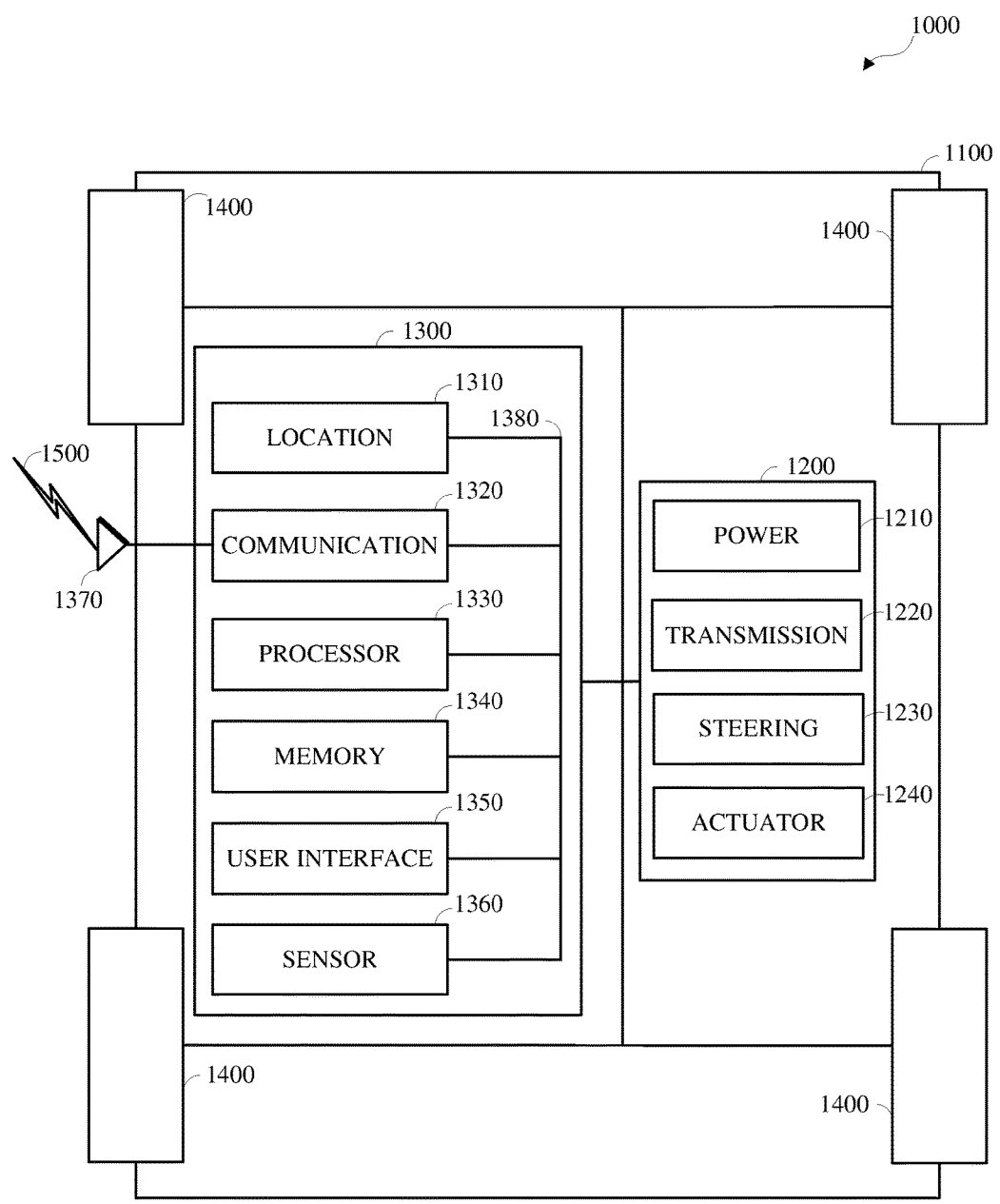
FIG. 1 is a diagram of an example of a portion of an autonomous vehicle in which the aspects, features, and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, the vehicle transportation network information may omit information identifying a docking location, where the autonomous vehicle may stop to allow for operations such as passenger loading or unloading, which may be independent of a parking location for the destination.

Autonomous vehicle routing and navigation using passenger docking locations may include identifying one or more docking locations in the vehicle transportation network for destinations represented in the vehicle transportation network information. The docking locations may be identified based on operating information for multiple vehicles, such as manually operated vehicles.

The embodiments of the methods disclosed herein, or any part or parts thereof, including and aspects, features, elements thereof, may be implemented in a computer program, software, or firmware, or a portion thereof, incorporated in a tangible non-transitory computer-readable or computer-usable storage medium for execution by a general purpose or special purpose computer or processor.

As used herein, the terminology "computer" or "computing device" includes any unit, or combination of units, capable of performing any method, or any portion or portions thereof, disclosed herein.

As used herein, the terminology "processor" indicates one or more processors, such as one or more general purpose processors, one or more special purpose processors, one or more conventional processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of an autonomous vehicle in which the aspects, features, and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the autonomous vehicle. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more general purpose processors, one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, an autonomous vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the autonomous vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the autonomous vehicle 1000.

In some embodiments, the sensors 1360 may include sensors that are operable to obtain information regarding the physical environment surrounding the autonomous vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the autonomous vehicle 1000 may include a trajectory controller. For example, the controller 1300 may include the trajectory controller. The trajectory controller may be operable to obtain information describing a current state of the autonomous vehicle 1000 and a rout planned for the autonomous vehicle 1000, and, based on this information, to determine and optimize a trajectory for the autonomous vehicle 1000. In some embodiments, the trajectory controller may output signals operable to control the autonomous vehicle 1000 such that the autonomous vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the autonomous vehicle 1000 under control of the transmission 1220, or a steered and propelled wheel that may steer and propel the autonomous vehicle 1000.

Although not shown in FIG. 1, an autonomous vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
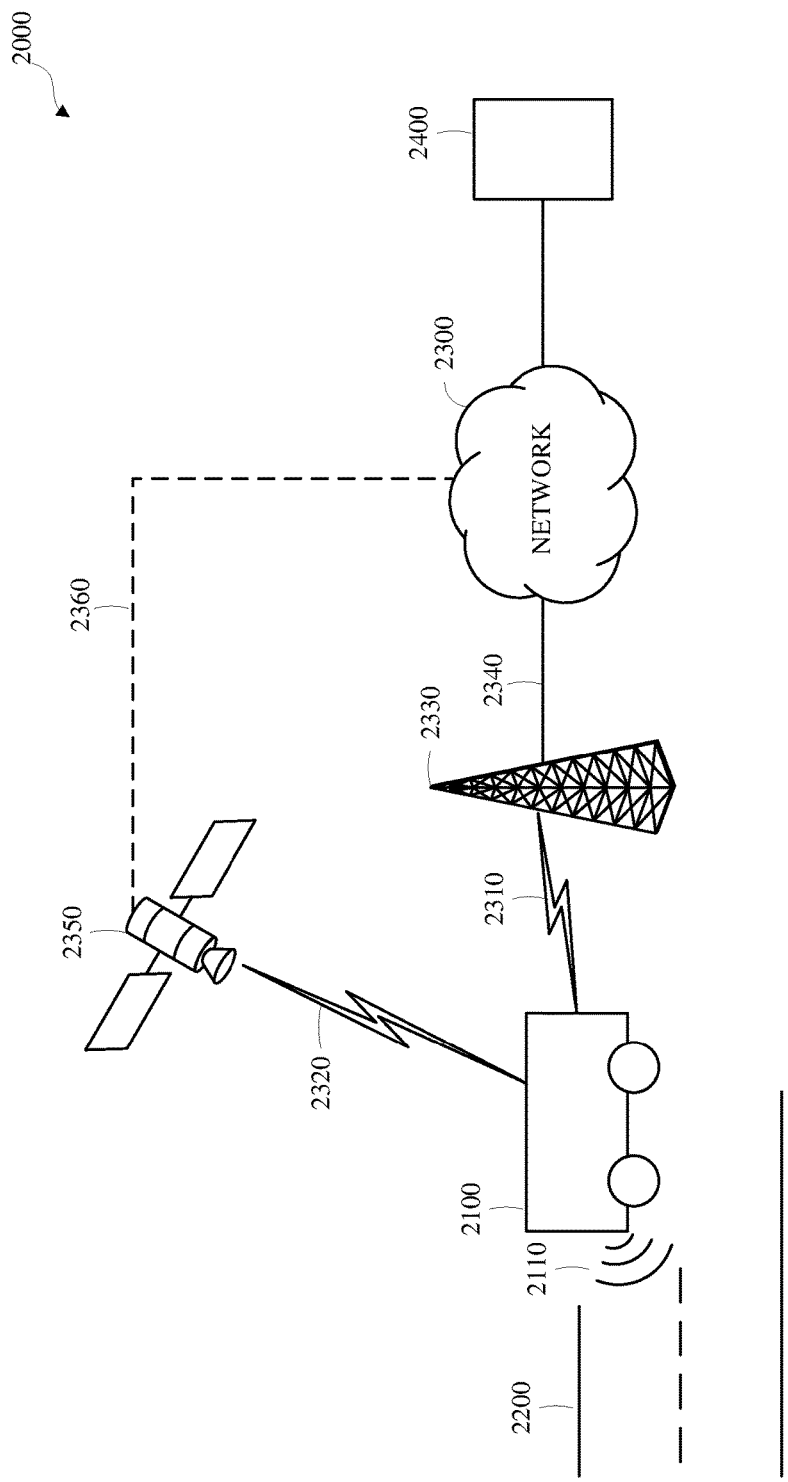
FIG. 2 is a diagram of an example of a portion of an autonomous vehicle transportation and communication system in which the aspects, features, and elements disclosed herein may be implemented.

FIG. 2 is a diagram of an example of a portion of an autonomous vehicle transportation and communication system in which the aspects, features, and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. An access point 2330, which may include a computing device, may be configured to communicate with an autonomous vehicle 2100, with a communication network 2300, with one or more communicating devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the autonomous vehicle 2100 may communicate with the communications network 2300 via a satellite 2350, or other non-terrestrial communication device. A satellite 2350, which may include a computing device, may be configured to communicate with an autonomous vehicle 2100, with a communication network 2300, with one or more communicating devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle may include one or more on-vehicle sensors 2110, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, an autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although, for simplicity, FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units, or elements not shown in FIG. 2. Although the autonomous vehicle 2100 is shown as a single unit, an autonomous vehicle may include any number of interconnected elements.

Figure 3:
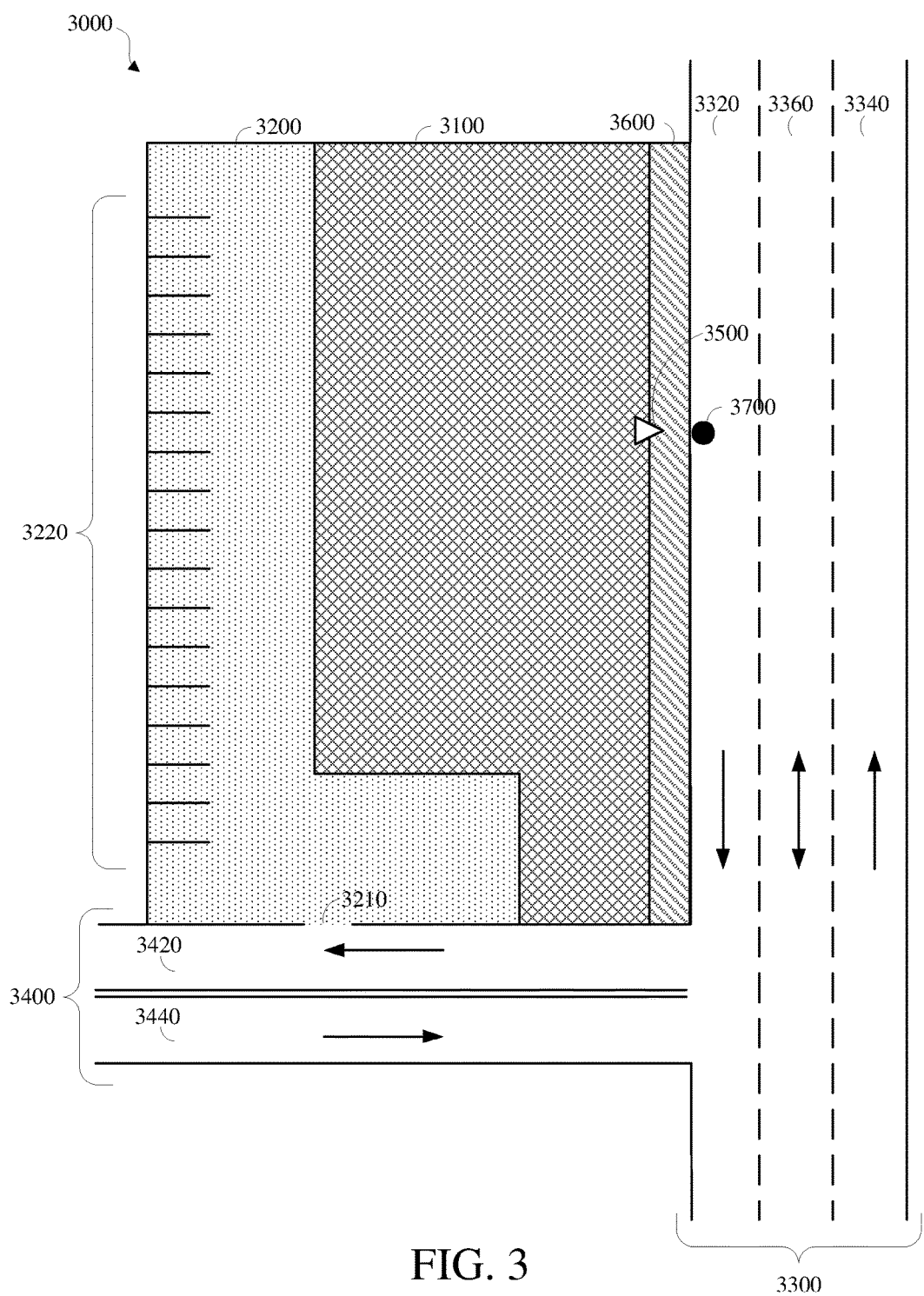
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400 may include one or more lanes 3320/3340/3360/3420/3440, and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the Figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information may identify the unnavigable area (building) 3100 and the adjacent partially navigable parking area 3200 as a point of interest, an autonomous vehicle may identify the point of interest as a destination, and the autonomous vehicle may travel from an origin to the destination by traversing the vehicle transportation network. Although the parking area 3200 associated with the unnavigable area (building) 3100 is shown as adjacent to the unnavigable area (building) 3100 in FIG. 3, a destination may include, for example, a building and a parking area that is physically non-adjacent to the building. In some embodiments, identifying a destination may include identifying a location for the destination, which may be a discrete uniquely identifiable geolocation. For example, the vehicle transportation network may include a defined location, such as a street address, a postal address, a vehicle transportation network address, or a GPS address, for the destination.

In some embodiments, a destination may be associated with one or more entrances, such as the entrance 3500 shown in FIG. 3. In some embodiments, the vehicle transportation network information may include defined entrance location information, such as information identifying a geolocation of an entrance associated with a destination. In some embodiments, predicted entrance location information may be determined as described herein.

In some embodiments, the vehicle transportation network may be associated with, or may include, a pedestrian transportation network. For example, FIG. 3 includes a portion 3600 of a pedestrian transportation network, which may be a pedestrian walkway. In some embodiments, a pedestrian transportation network, or a portion thereof, such as the portion 3600 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

In some embodiments, a destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

In some embodiments, the vehicle transportation network information may include docking location information, such as information identifying a geolocation of one or more docking locations 3700 associated with a destination. In some embodiments, the docking location information may be defined docking location information, which may be docking location information manually included in the vehicle transportation network information. For example, defined docking location information may be included in the vehicle transportation network information based on user input. In some embodiments, the docking location information may be automatically generated docking location information as described herein. Although not shown separately in FIG. 3, docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

In an example, an autonomous vehicle may identify a point of interest, which may include the unnavigable area (building) 3100, the parking area 3200, and the entrance 3500, as a destination. The autonomous vehicle may identify the unnavigable area (building) 3100, or the entrance 3500, as a primary destination for the point of interest, and may identify the parking area 3200 as a secondary destination. The autonomous vehicle may identify the docking location 3700 as a docking location for the primary destination. The autonomous vehicle may generate a route from an origin (not shown) to the docking location 3700. The autonomous vehicle may traverse the vehicle transportation network from the origin to the docking location 3700 using the route. The autonomous vehicle may stop or park at the docking location 3700 such that passenger loading or unloading may be performed. The autonomous vehicle may generate a subsequent route from the docking location 3700 to the parking area 3200, may traverse the vehicle transportation network from the docking location 3700 to the parking area 3200 using the subsequent route, and may park in the parking area 3200.

Figure 4:
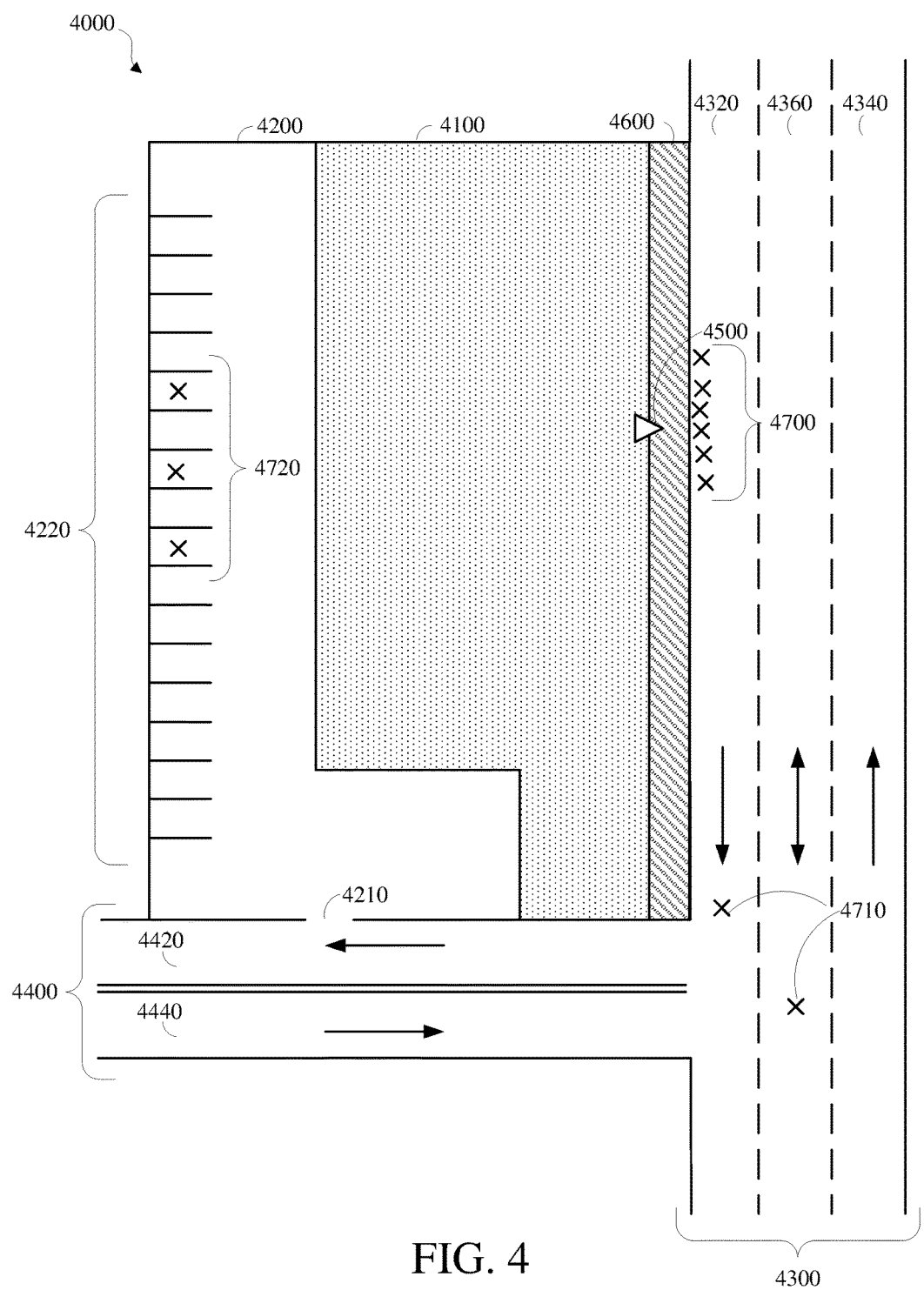
FIG. 4 is a diagram of a portion of a vehicle transportation network including candidate docking locations in accordance with this disclosure.

FIG. 4 is a diagram of a portion of a vehicle transportation network including docking locations in accordance with this disclosure. The portion of the vehicle transportation network 4000 shown in FIG. 4 may be similar to the portion of the vehicle transportation network 3000 shown in FIG. 3 with the addition or modification of certain features described herein.

The vehicle transportation network 4000 may include one or more unnavigable areas 4100, such as a building, one or more partially navigable areas, such as parking area 4200, one or more navigable areas, such as roads 4300/4400, or a combination thereof. The vehicle transportation network may include one or more interchanges 4210 between one or more navigable, or partially navigable, areas 4200/4300/4400. For example, the portion of the vehicle transportation network shown in FIG. 4 includes an interchange 4210 between the parking area 4200 and road 4400. In some embodiments, the parking area 4200 may include parking slots 4220. A portion of the vehicle transportation network, such as a road 4300/4400 may include one or more lanes 4320/4340/4360/4420/4440, and may be associated with one or more directions of travel, which are indicated by arrows in FIG. 4. In some embodiments, a portion, or a combination of portions, of the vehicle transportation network may be identified as a point of interest or a destination. For example, the vehicle transportation network information may identify the unnavigable area (building) 4100 and the adjacent partially navigable parking area 4200 as a destination. In some embodiments, a destination may be associated with one or more entrances, such as the entrance 4500. In some embodiments, the vehicle transportation network may include pedestrian navigable areas 4600, such as a pedestrian walkway.

In some embodiments, an autonomous vehicle, such as the autonomous vehicle 1000 shown in FIG. 1 or the autonomous vehicle 2100 shown in FIG. 2, may traverse a portion or portions of the vehicle transportation network 4000.

In some embodiments, the vehicle transportation network information may omit defined docking location information for one or more destinations and may include automatically generated docking location information, which may be generated based on vehicle operating information.

Vehicle operating information may include operating information generated for one or more vehicles, which may be manually operated vehicles, and may include vehicle probe data, vehicle location information, vehicle status information, vehicle event information, vehicle bus data, such as controller area network (CAN) data, or any other information generated based on vehicle operation. The operating information may include information indicating vehicle operations. A vehicle operation may include event indicators, which may include a type of vehicle operation or an event, such as start, stop, stand, park, door open, door close, load, or unload. A vehicle operation may include a date, a time, or both. A vehicle operation may indicate a location, such as a GPS location within the vehicle transportation network. A vehicle operation may include vehicle state information, such as a current number of passengers or occupancy, a change in occupancy, or a passenger presence state. In some embodiments, automatically generating the docking location information may include filtering the vehicle operating information.

In some embodiments, docking location information may be automatically generated based on vehicle operating information that includes information generated for a defined type of vehicle. For example, the operating information may include a vehicle type indicator, which may indicate whether a vehicle is a fleet vehicle, such as a taxi or a parcel delivery vehicle, and the operating information may be filtered to omit operating information for non-fleet type vehicles. In another example, the operating information may include a vehicle operating type indicator, which may indicate whether a vehicle is a low occupancy carrier vehicle, such as a vehicle operating as a taxi or a parcel delivery vehicle, and the operating information may be filtered to omit operating information for vehicles operating as non-low occupancy carrier vehicles.

In some embodiments, automatically generating the docking location information may include identifying docking locations based on the vehicle operating information. For example, the vehicle operating information may indicate a vehicle operation including a stationary period, such as a period or duration between a vehicle stop event and a subsequent vehicle start event, which may be identified as a candidate docking operation, and a corresponding location may be identified as a candidate docking location. For simplicity and clarity, in FIGS. 4-5, 10-11, 17, 19, and 22, each candidate docking location is shown using an X mark. For example, FIG. 4 includes eleven X marks 4700/4710/4720 representing eleven candidate docking locations.

In some embodiments, the candidate docking locations may be filtered based on one or more metrics, such as stationary period, vehicle status, or location information. For example, the candidate docking locations 4710 near the intersection of the roads 4300/4400 may be filtered or omitted from the candidate docking locations represented by the vehicle transportation network information.

Figure 5:
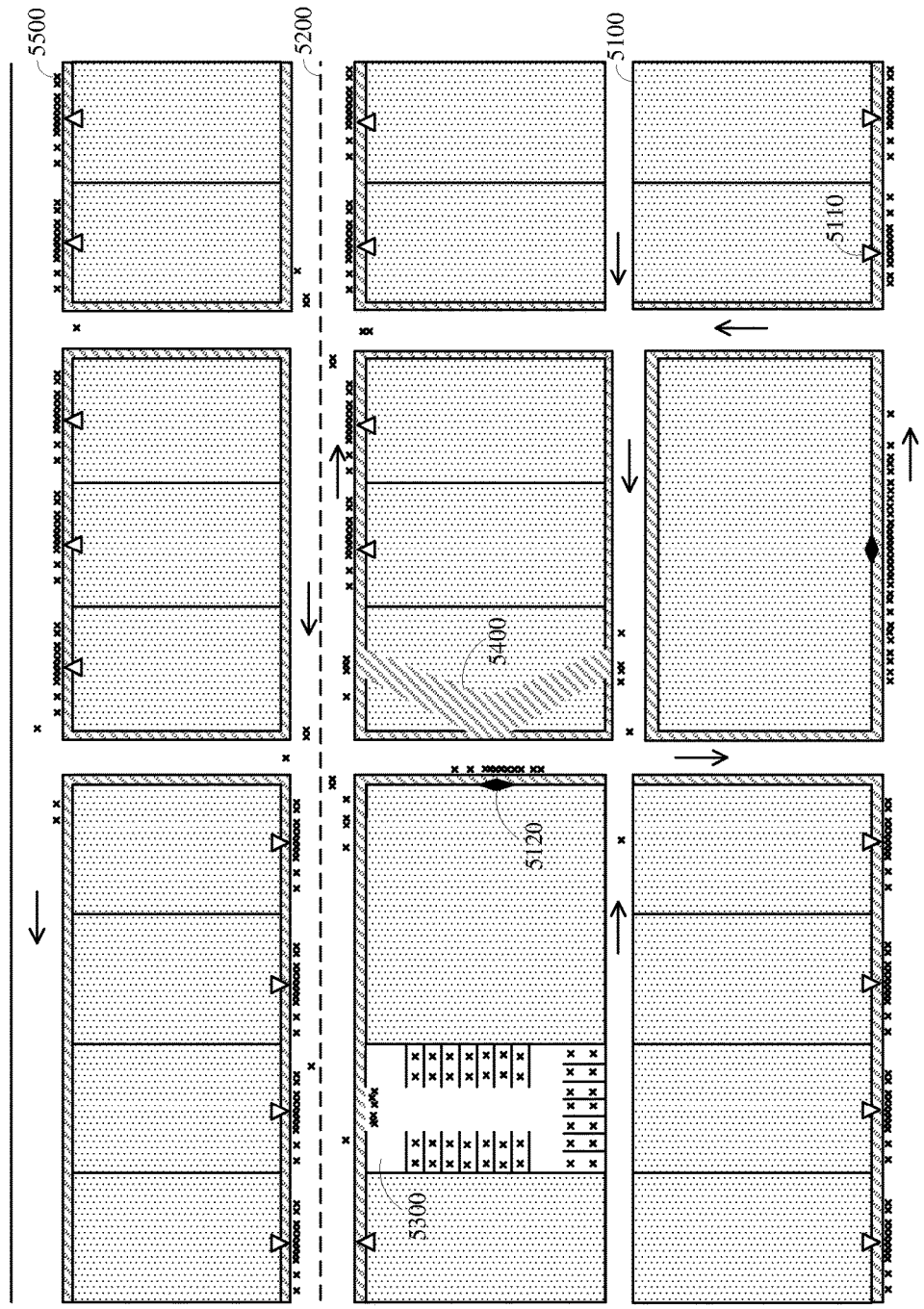
FIG. 5 is a diagram of another portion of a vehicle transportation network including candidate docking locations in accordance with this disclosure.

FIG. 5 is a diagram of another portion of a vehicle transportation network including candidate docking locations in accordance with this disclosure. The portion of the vehicle transportation network shown in FIG. 5 may include one or more unnavigable areas 5100, such as a building, one or more navigable areas, such as roads 5200, one or more partially navigable areas, such as parking area 5300, one or more pedestrian navigable areas 5400, one or more candidate docking locations 5500, or a combination thereof. In some embodiments, the vehicle transportation network information may include predicted entrance information, which is indicated as a white triangle 5110 in FIG. 5. In some embodiments, the vehicle transportation network information may include defined entrance information, which is indicated as a black diamond 5120 in FIG. 5.

Figure 6:
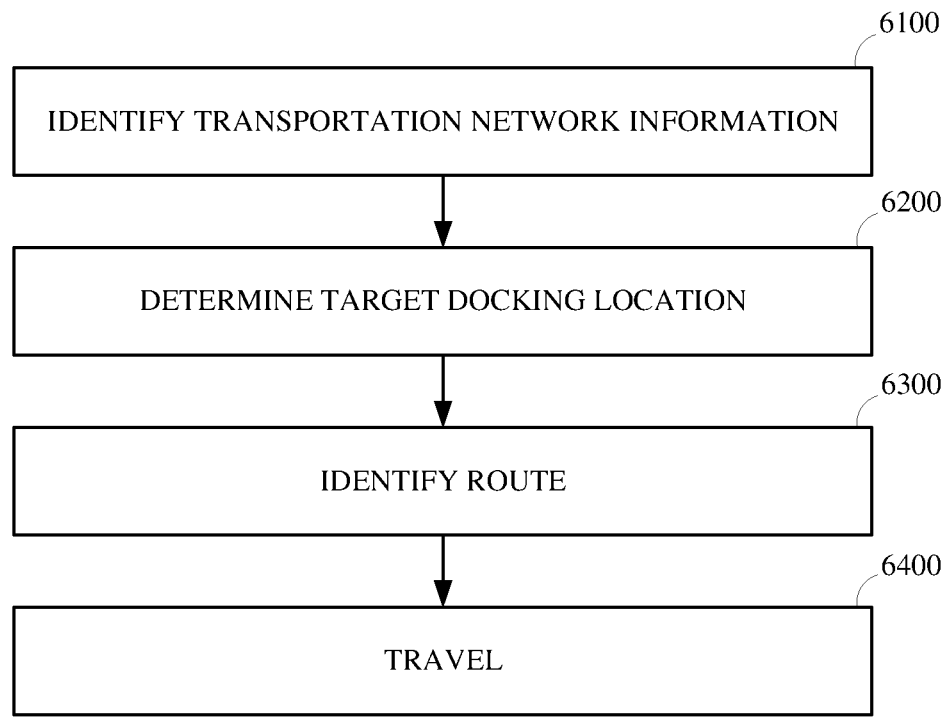
FIG. 6 is a diagram of a method of autonomous vehicle navigation and routing using docking locations in accordance with this disclosure.

FIG. 6 is a diagram of a method of autonomous vehicle navigation and routing using docking locations in accordance with this disclosure. Autonomous vehicle navigation and routing using docking locations may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle navigation and routing using docking locations. Implementations of autonomous vehicle navigation and routing using docking locations may include identifying vehicle transportation network information at 6100, determining a target docking location at 6200, identifying a route at 6300, traveling at 6400, or a combination thereof.

In some embodiments, vehicle transportation network information, such as the vehicle transportation network information shown in FIG. 3, may be identified at 6100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, the vehicle transportation network information may include docking location information representing one or more docking locations within the vehicle transportation network. In some embodiments, the autonomous vehicle may identify the vehicle transportation network information such that the vehicle transportation network information includes defined docking location information, automatically generated docking location information, or both.

In some embodiments, identifying the vehicle transportation network information may include transcoding or reformatting the vehicle transportation network information, storing the reformatted vehicle transportation network information, or both.

In some embodiments, a destination may be identified at 6200. Identifying a destination may include identifying a point of interest, such as the unnavigable area (building) 3100 shown in FIG. 3, the unnavigable area (building) 4100 shown in FIG. 4, or a unnavigable area (building) 5100 shown in FIG. 5, as a primary destination, identifying a parking area associated with the point of interest as a secondary destination, or identifying both a primary and a secondary destination. In some embodiments, a target docking location for to the primary destination within the vehicle transportation network may be identified at 6200 based on the vehicle transportation network information. For example, a building, such as the unnavigable area (building) 3100 shown in FIG. 3, may be identified as the primary destination, and a docking location, such as the docking location 3700 shown in FIG. 3, may be identified as the target docking location.

In some embodiments, automatically generating the docking location information may include evaluating a sequence of events indicated in the operating information for a vehicle. For example, the operating information may include event indicators that describe the sequence of events, which may include a stop event and a subsequent start event, and evaluating the sequence of events may include determining the stationary period as a temporal difference between the stop event and the start event. In some embodiments, identifying the candidate docking locations may include identifying vehicle transportation network information corresponding to the vehicle transportation network locations indicated in the operating information.

A route may be generated at 6300. In some embodiments, generating the route may include identifying an origin. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 6300 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or a combination thereof, near, or proximal to, the current location of the autonomous vehicle. Generating the route may include determining a route from the origin to the target docking location identified at 6200.

In some embodiments, generating the route may include generating candidate routes from the origin to the target docking location. In some embodiments, a candidate route may represent a unique or distinct route from the origin to the target docking location. For example, a candidate route may include a unique or distinct combination of roads, road segments, lanes, waypoints, and interchanges.

In some embodiments, generating the route may include identifying routing states. In some embodiments, identifying routing states may include identifying a routing state corresponding to each waypoint in a candidate route, for each of the candidate routes. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, generating the route may include evaluating the expected action costs for performing an action, such as transitioning from one routing state to another, which may correspond with transitioning from one waypoint to another, and may represent the expected cost of the autonomous vehicle traveling from one location, represented by the first waypoint, to another location, represented by the second waypoint, during execution of the route. In some embodiments, an action may indicate a transition from a routing state to an immediately adjacent routing state, which may correspond with transitioning from a waypoint to an immediately adjacent waypoint without intersecting another waypoint, and may represent an autonomous vehicle traveling from a location, represented by the first waypoint, to another location, represented by the immediately adjacent waypoint.

In some embodiments, an action cost may be determined based on the vehicle transportation network information. For example, within a candidate route, a first routing state may correspond with a first waypoint, which may correspond with a first location in the vehicle transportation network, a second routing state may correspond with a second waypoint, which may correspond with second location in the vehicle transportation network, and the action cost may represent an estimated, predicted, or expected cost for the autonomous vehicle to travel from the first location to the second location. In some embodiments, action costs may be context dependent. For example, the action cost for transitioning between two waypoints at one time of day may be significant higher than the action costs for transitioning between the waypoints at another time of day.

In some embodiments, generating the route may include generating probability distributions. In some embodiments, generating the probability distributions may include generating a probable cost distribution for performing an action, such as transitioning from one routing state to another. Generating a probably cost distribution may include determining a probability of successfully performing an action, the probability of failing to perform the action, determining multiple possible costs for performing the action, determining probable costs associating probabilities with possible costs, or a combination thereof.

In some embodiments, generating a probability distribution may include using a normal, or Gaussian, distribution, $N(\mu, \sigma)$, where $\mu$ indicates the mean of the normal distribution, and $\sigma$ indicates the standard deviation. The mean of the normal distribution and the standard deviation may vary from one action to another. In some embodiments, the standard deviation may be augmented based on an action cost uncertainty variance modifier, which may represent variation in the uncertainty of action costs.

In some embodiments, generating a probability distribution may include generating discrete cost probability combinations for an action. For example, for an action in a route, generating a probability distribution may include generating a first probable cost as a combination of a first action cost, such as 45, and a first probability, such as 0.05, and generating a second probable cost as a combination of a second action cost, such as 50, and a second probability, such as 0.08.

In some embodiments, generating a probability distribution may include using a liner model of resources and costs. For example, the probability distribution for the travel time associated with an action may be represented by piece-wise constant functions, and the costs for performing an action may be represented by piece-wise linear functions.

In some embodiments, determining the action cost may include evaluating cost metrics, such as a distance cost metric, a duration cost metric, a fuel cost metric, an acceptability cost metric, or a combination thereof. In some embodiments, the cost metrics may be determined dynamically or may be generated, stored, and accessed from memory, such as in a database. In some embodiments, determining the action cost may include calculating a cost function based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. In some embodiments, an acceptability factor may indicate that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics may include weighting the cost metrics and calculating the action cost based on the weighted cost metrics. Weighting a cost metric may include identifying a weighting factor associated with the cost metric. For example, identifying a weighting factor may include accessing a record indicating the weighting factor and an association between the weighting factor and the cost metric. In some embodiments, weighting a cost metric may include generating a weighted cost metric based on the weighting factor and the cost metric. For example, a weighted cost metric may be a product of the weighting factor and the cost metric. In some embodiments, estimating the action cost may include calculating a sum of cost metrics, or a sum of weighted cost metrics.

In some embodiments, generating the route may include identifying an optimal route. Identifying the optimal route may include selecting a candidate route from the candidate routes based on the probability distributions. For example, a candidate route having a minimal probable route cost may be identified as the optimal route. In some embodiments, identifying the optimal route may include using a constant time stochastic control process, such as a hybrid Markov decision process.

In some embodiments, identifying the optimal route may include selecting the minimum probable action cost from among an action cost probability distribution for transitioning from a first routing state to a second routing state and an action cost probability distribution for transitioning from the first routing state to a third routing state.

In some embodiments, identifying the optimal route may include generating a route cost probability distribution for a candidate route based on the action cost probability distributions for each action in the route. In some embodiments, identifying the optimal route may include generating a route cost probability distribution for each candidate route and selecting the candidate route with the lowest, or minimum, probable route cost as the optimal route.

In some embodiments, the controller may output or store the candidate routes, the optimal route, or both. For example, the controller may store the candidate routes and the optimal route and may output the optimal route to a trajectory controller, vehicle actuator, or a combination thereof, to operate the autonomous vehicle to travel from the origin to the target docking location using the optimal route.

In some embodiments, the autonomous vehicle may travel from the origin to the target docking location using the optimal route at 6400. For example, the autonomous vehicle may include a vehicle actuator, such as the actuator 1240 shown in FIG. 1, and vehicle actuator may operate the autonomous vehicle to begin traveling from the origin to the target docking location using the optimal route. In some embodiments, the autonomous vehicle may include a trajectory controller and the trajectory controller may operate the autonomous vehicle to begin travelling based on the optimal route and current operating characteristics of the autonomous vehicle, and the physical environment surrounding the autonomous vehicle.

In some embodiments, the optimal route may be updated. In some embodiments, updating the optimal route may include updating or regenerating the candidate routes and probability distributions, and identifying the updated optimal route from the updated or regenerated candidate routes and probability distributions.

In some embodiments, the optimal route may be updated based on updated vehicle transportation network information, based on differences between actual travel costs and the probable costs of the selected route, or based on a combination of updated vehicle transportation network information and differences between actual travel costs and the probable costs of the selected route.

In some embodiments, the autonomous vehicle may receive current vehicle transportation network state information before or during travel. In some embodiments, the autonomous vehicle may receive current vehicle transportation network state information, such as off-vehicle sensor information, from an off-vehicle sensor directly, or via a network, such as the electronic communication network 2300 shown in FIG. 2. In some embodiments, the optimal route may be updated in response to receiving current vehicle transportation network state information. For example, the current vehicle transportation network state information may indicate a change of a state, such as a change from open to closed, of a portion of the vehicle transportation network that is included in the optimal route, updating the candidate routes may include removing candidate routes including the closed portion of the vehicle transportation network and generating new candidate routes and probability distributions using the current location of the autonomous vehicle as the origin, and updating the optimal route may include identifying a new optimal route from the new candidate routes.

In some embodiments, the autonomous vehicle may complete traveling to the target docking location from the current location of the autonomous vehicle using the updated optimal route.

Figure 8:
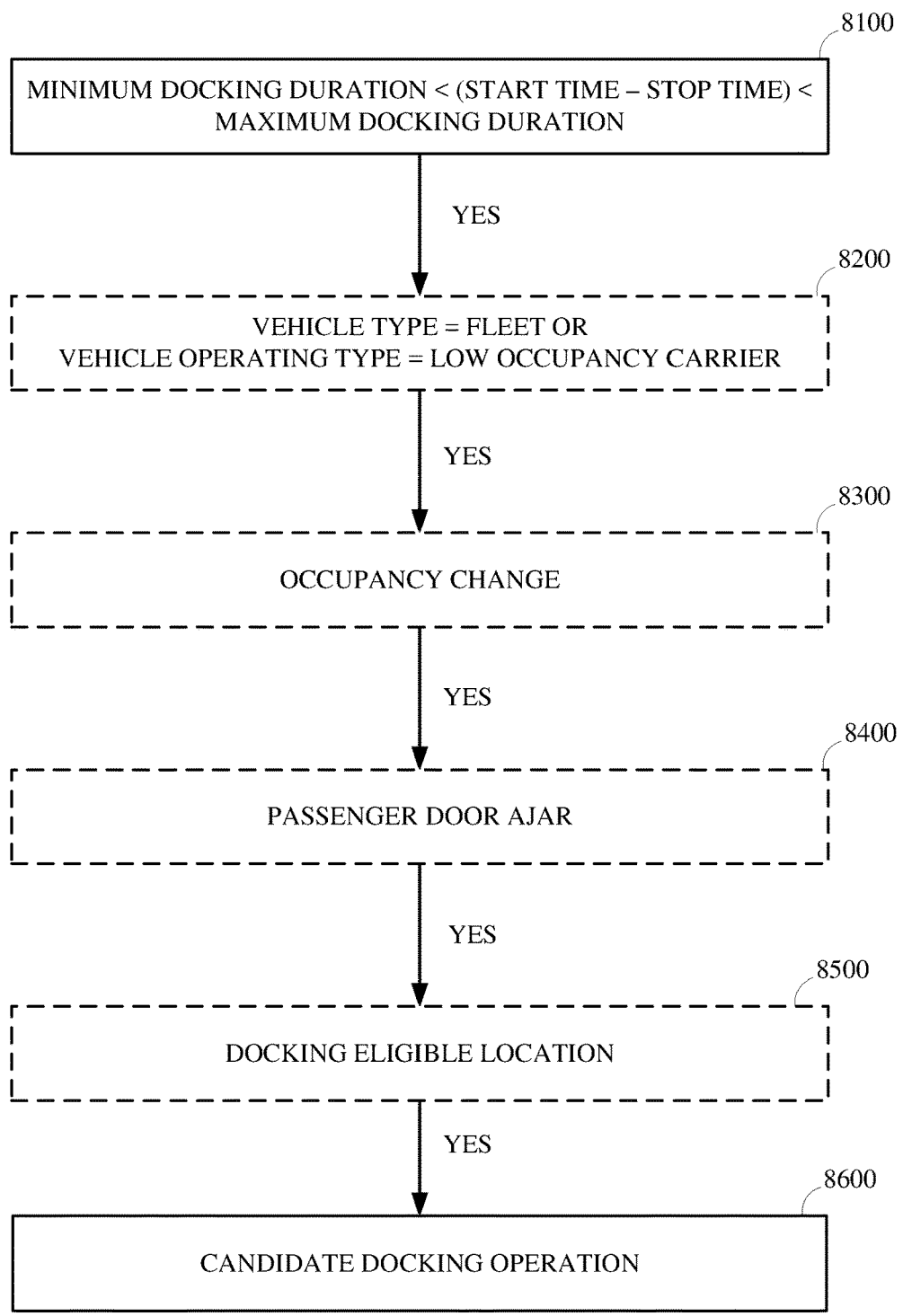
FIG. 8 is a diagram of a method of filtering candidate docking operations in accordance with this disclosure.
Figure 9:
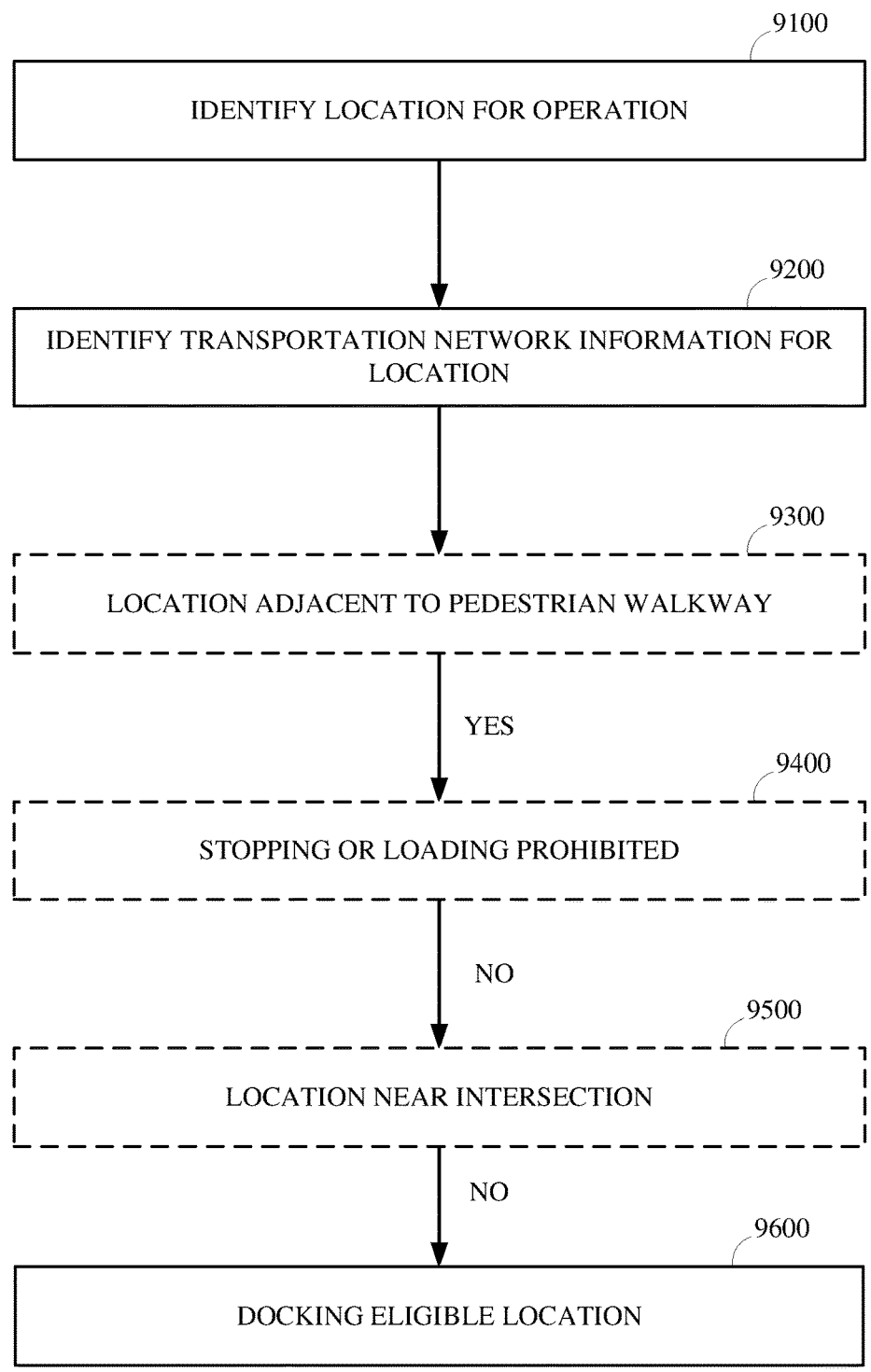
FIG. 9 is a diagram of a method of determining docking location eligibility in accordance with this disclosure.

In some implementations, the vehicle transportation network information identified at 6100 may identify docking locations in the vehicle transportation network. For example, the vehicle transportation network information may include defined docking location information, automatically generated docking location information, or both. The automatically generated docking location information may be generated based on vehicle operating information for multiple vehicles. Generating the docking location information based on the vehicle operating information may include filtering, or otherwise evaluating, the operating information to identify candidate docking operations, and corresponding candidate docking locations, as shown in FIGS. 7-9.

Figure 7:
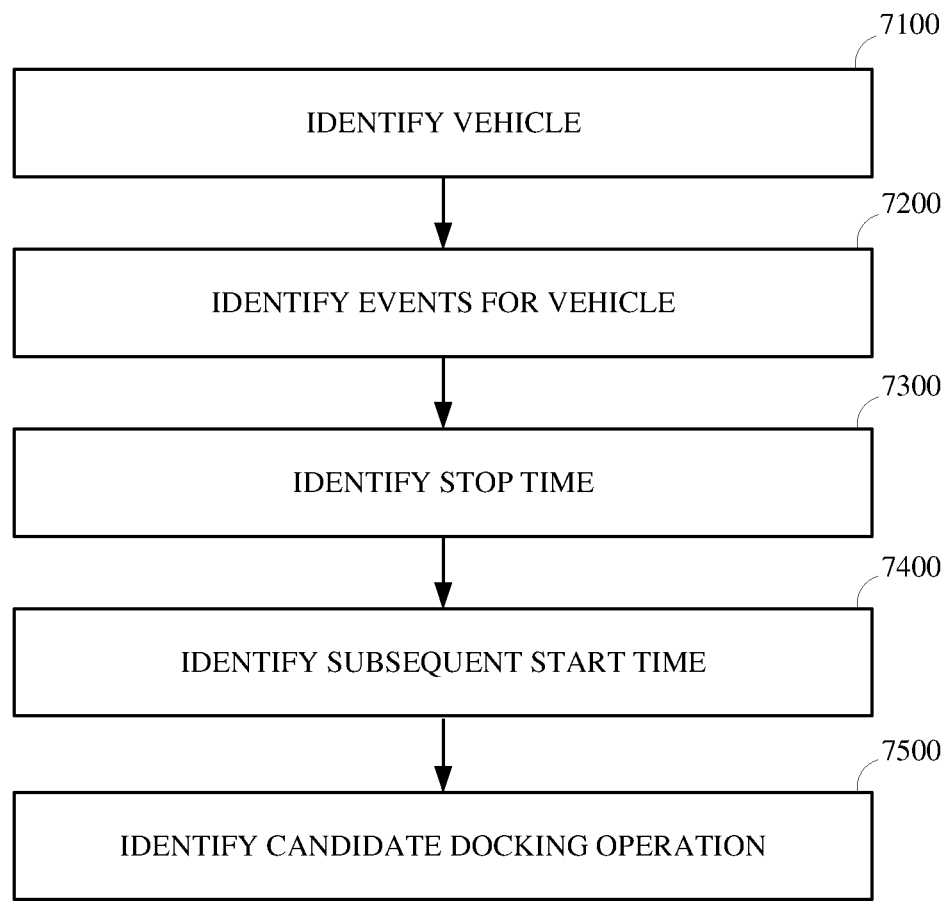
FIG. 7 is a diagram of a method of identifying candidate docking operations in accordance with this disclosure.

FIG. 7 is a diagram of a method of identifying a candidate docking operation in accordance with this disclosure. In some embodiments, identifying a candidate docking operation may include filtering, or otherwise evaluating, operating information for multiple vehicles. Implementations of identifying a candidate docking operation may include identifying a vehicle at 7100, identifying events for the vehicle at 7200, identifying a stop time at 7300, identifying a subsequent start time at 7400, identifying a candidate docking operation at 7500, or a combination thereof. In some embodiments, the candidate docking operation may be a docking operation performed at the target docking location A vehicle may be identified at 7100. The vehicle operating information may include operating information for multiple vehicles and identifying candidate docking operations may include identifying a vehicle from the vehicle operating information. For example, the vehicle operating information may include records, each record may be associated with a vehicle identifier, and individual vehicles may be uniquely identified based on the vehicle identifiers.

Events may be identified at 7200 for a vehicle, such as the vehicle identified at 7100. For example, the vehicle operating information may include information indicating events, such as stop events or start events, for the vehicle. In some embodiments, identifying events may include ordering the events. For example, the events may be ordered based on temporal order.

A stop time may be identified at 7300 based on events, such as the events identified at 7200. A subsequent start time may be identified at 7400 based on the events and an identified time, such as the stop time identified at 7300. For example, a subsequent start time may correspond with a most temporally proximate start operation subsequent to the stop time identified at 7300.

Candidate docking operations may be identified at 7500. For example, identifying a candidate docking operation may include identifying vehicle operating information for the vehicle identified at 7100 corresponding to the stationary period from the stop time identified at 7300 to the start time identified at 7400, which may include identifying a location of the vehicle during the identified period. For example, the stationary period may be identified as a temporal difference between the stop time identified at 7300 and the start time identified at 7400. The candidate docking operations, and corresponding candidate docking locations, may be filtered as shown in FIGS. 8-9.

FIG. 8 is a diagram of a method of filtering candidate docking operations in accordance with this disclosure. Implementations of filtering candidate docking operations may include evaluating a stationary period at 8100, evaluating a vehicle type, a vehicle operating type, or both at 8200, evaluating vehicle occupancy at 8300, evaluating vehicle state information at 8400, evaluating docking location eligibility at 8500, including or omitting operations from the candidate docking operations at 8600, or a combination thereof. In some embodiments, the candidate docking operation may be a docking operation performed at the target docking location.

A stationary period for a candidate docking operation may be evaluated at 8100. In some embodiments, evaluating the stationary period may include determining the stationary period. For example, a stationary period may be identified based on operating information, which may include a stop time and a subsequent start time, as shown in FIG. 7. Evaluating the stationary period may include determining whether the stationary period is greater than a defined minimum docking duration, and filtering the operating information to omit candidate docking operations that have a stationary period that is less than the defined minimum docking duration. Evaluating the stationary period may include determining whether the stationary period is within a defined maximum docking duration, and filtering the operating information to omit candidate docking operations that have a stationary period that exceeds the defined maximum docking duration.

For example, the stationary period may exceed a minimum docking duration, which may indicate a minimum amount of time for performing a docking operation, and the location corresponding to the vehicle operation may be identified as a candidate docking location. Locations corresponding to stationary periods that are shorter than the minimum docking duration may be omitted from the candidate docking locations.

In another example, the stationary period may be within a maximum docking duration, which may indicate a maximum amount of time for performing a docking operation, and the location corresponding to the vehicle operation may be identified as a candidate docking location. Locations corresponding to stationary periods that are longer than the maximum docking duration may be omitted from the candidate docking locations. For example, the operating information for the candidate docking locations 4720 in the parking area 4200 shown in FIG. 4, may indicate a parking operation, a stationary period that exceeds the maximum docking duration, or both, and the locations may be omitted from the candidate docking locations.

Vehicle type, vehicle operating type, or both, may be evaluated at 8200. Evaluating the vehicle type may include determining whether the operating information indicates that the vehicle is a defined vehicle type, such as a fleet vehicle, and filtering the operating information to omit candidate docking operations that are not associated with fleet vehicles. Evaluating the vehicle operating type may include determining whether the operating information indicates that the vehicle is operating as a defined vehicle operating type, such as a low occupancy carrier vehicle operating type, and filtering the operating information to omit candidate docking operations that are not associated with vehicles operating as low occupancy carrier vehicles. In some embodiments, evaluating the vehicle operating type may include filtering the operating information to omit candidate docking operations that are not associated with fleet vehicles operating as low occupancy carrier vehicles.

Vehicle occupancy may be evaluated at 8300. For example, the operating information may include occupancy information, which may indicate a number, count, or cardinality of vehicle occupants or passengers, seat occupancy information, such as driver's seat occupancy information or passenger seat occupancy information, or a combination of vehicle and seat occupancy information, and candidate docking locations may be identified based on a change in occupancy. For example, a location associated with a vehicle operation that has stationary period that exceeds the minimum docking duration and is within the maximum docking duration, and has an unchanged occupancy indication may be omitted from the candidate docking locations. In some embodiments, a change in occupancy may be indicated based on a signal from a vehicle sensor, such as a seat occupant sensor. For example, evaluating the vehicle occupancy may include filtering the operating information to omit candidate docking operations that are not associated with a change in a passenger occupancy signal.

Vehicle state information may be evaluated at 8400. For example, the operating information may include door ajar information, such as passenger door ajar information, and candidate docking locations may be identified based on the passenger door ajar information. For example, evaluating the vehicle state information may include filtering the operating information to omit candidate docking operations that are not associated with passenger door ajar information.

Docking location eligibility may be evaluated at 8500. For example, docking location eligibility may be evaluated based on adjacency to a pedestrian walkway, permissibility of stopping or loading, distance to an intersection, or a combination thereof, as shown in FIG. 9.

Vehicle operations may be included in the candidate docking operations at 8600 based on one or more of the metrics described at 8100, 8200, 8300, 8400, or 8500. In some embodiments, one or more of the metrics may be omitted. For example, the metrics described at 8200, 8300, 8400, and 8500 are shown using broken lines to indicate that one or more of the metrics may be omitted.

FIG. 9 is a diagram of a method of determining docking location eligibility in accordance with this disclosure. Implementations of determining docking location eligibility may include identifying a location at 9100, identifying vehicle transportation network information corresponding to the location at 9200, determining whether the location is adjacent to a pedestrian navigable area at 9300, determining whether the location is in a stopping or loading prohibited area at 9400, determining whether the location is near an intersection at 9500, including or omitting a location as docking eligible at 9600, or a combination thereof. In some embodiments, the candidate docking operation may be a docking operation performed at the target docking location.

A location corresponding to a candidate docking operation, such as a candidate docking operation identified as shown in FIGS. 7-8, may be identified at 9100. For example, the vehicle operating information may include location information corresponding to a candidate docking operation, such as a GPS location within the vehicle transportation network.

Vehicle transportation network information corresponding to the location identified at 9100 may be identified at 9200. In some embodiments, identifying the vehicle transportation network information corresponding to the location identified at 9100 may include identifying vehicle transportation network information for a portion of the vehicle transportation network proximate to the location. For example, the vehicle transportation network information identified may indicate a road, a road segment, a lane, an intersection, or an attribute thereof, such as a speed limit, or other traffic control regulation, corresponding to the identified location.

The vehicle transportation network information identified at 9100 may be evaluated to determine whether the location is adjacent to a pedestrian navigable area at 9300. For example, the vehicle transportation network information for the location of the candidate docking operation shown in lane 4360 in FIG. 4 may indicate that the location is immediately adjacent to lane 4320 and lane 4340, and is not immediately adjacent to a pedestrian navigable area, and evaluating the vehicle transportation network information may include filtering the operating information to omit candidate docking operations corresponding to the location. In another example, the vehicle transportation network information for the location of the candidate docking operations shown in lane 4320 in FIG. 4 may indicate that the location is immediately adjacent to a pedestrian navigable area 4600, and evaluating the vehicle transportation network information may include filtering the operating information to include candidate docking operations corresponding to the locations shown in lane 4320.

The vehicle transportation network information identified at 9100 may be evaluated to determine whether the location is in a stopping or loading prohibited area at 9400. For example, the vehicle transportation network information may indicate that the location associated with a candidate docking operation is within a portion of the vehicle transportation network that is identified as a stopping, standing, or loading prohibited area, and evaluating the vehicle state information may include filtering the operating information to omit candidate docking operations that are associated with a location that is identified as a stopping, standing, or loading prohibited area.

The vehicle transportation network information identified at 9100 may be evaluated to determine whether the location is near an intersection at 9500. For example, the vehicle transportation network information may indicate that a spatial difference, such as a distance, between the location associated with the candidate docking operation and an intersection exceeds a defined intersection docking buffer distance, and evaluating the vehicle state information may include filtering the operating information to omit candidate docking operations that are associated with a location that is within the intersection docking buffer distance from an intersection.

A location associated with a candidate docking operation may be identified docking eligible at 9600. For example, locations corresponding to the candidate docking operations may be identified docking eligible based on one or more of the metrics described at 9300, 9400, or 9500. In some embodiments, one or more of the metrics may be omitted. For example, the metrics described at 9300, 9400, and 9500 are shown using broken lines to indicate that one or more of the metrics may be omitted. In some embodiments, one or more additional metrics may be added. For example, locations within a parking area, such as the parking area 3200, may be omitted from the candidate docking locations.

Figure 10:
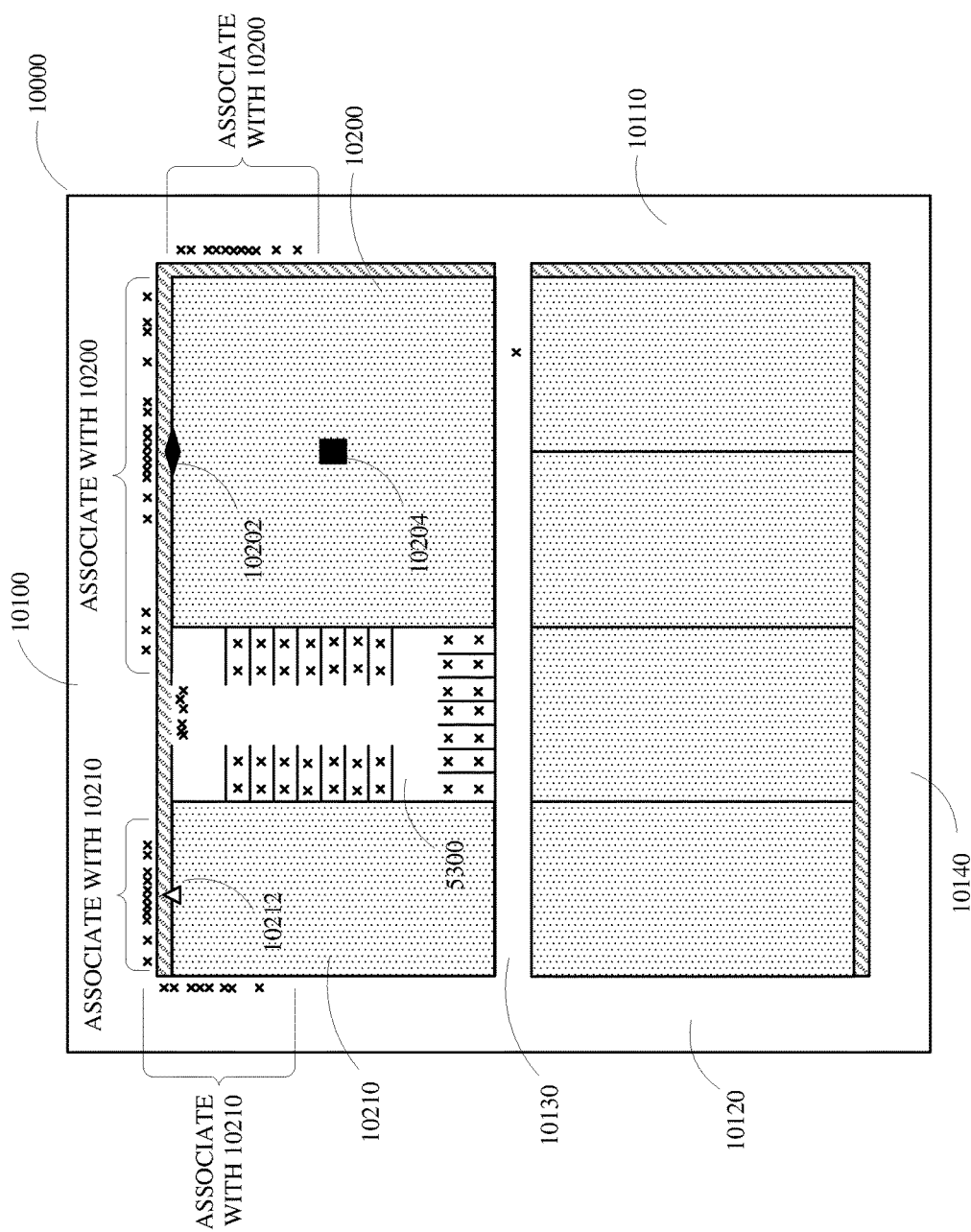
FIG. 10 is a diagram of a portion of a vehicle transportation network including candidate docking locations in accordance with this disclosure.
Figure 11:
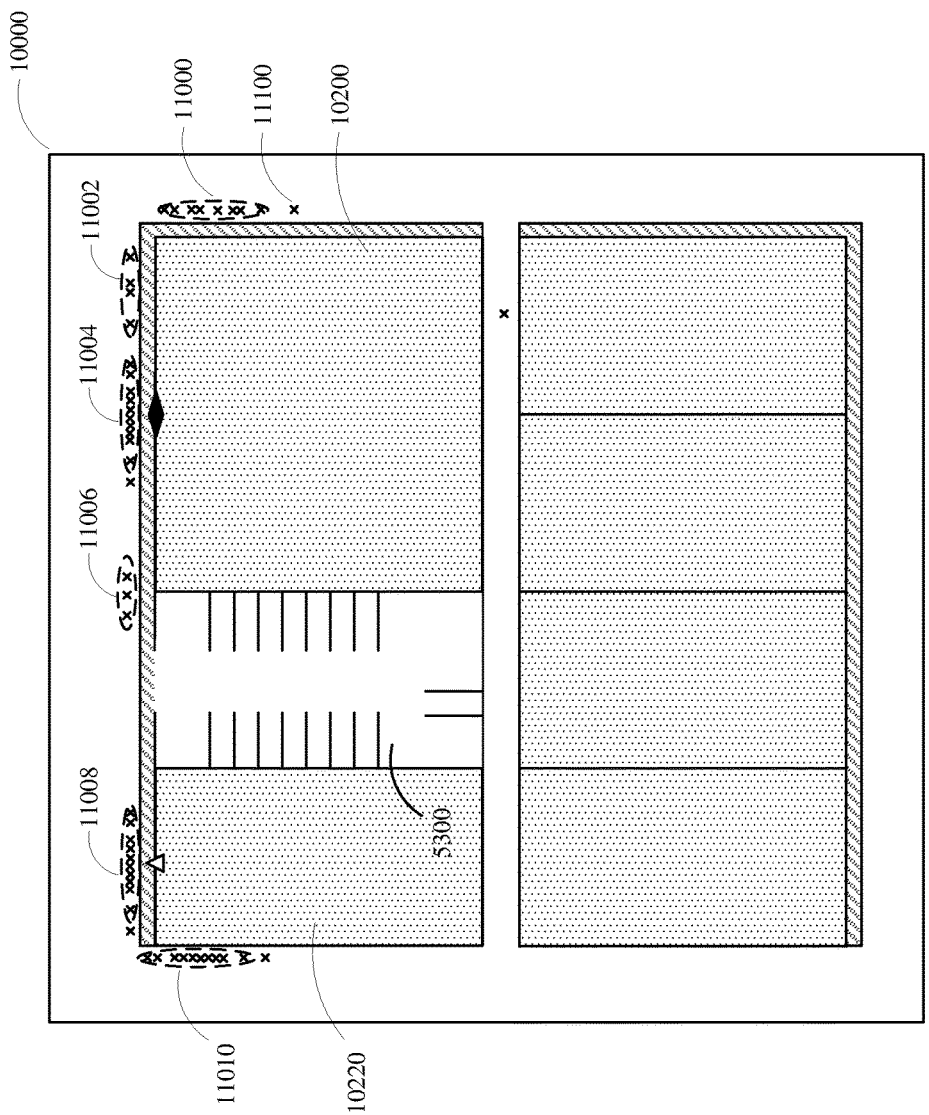
FIG. 11 is a diagram of a portion of a vehicle transportation network including docking location clusters in accordance with this disclosure.
Figure 12:
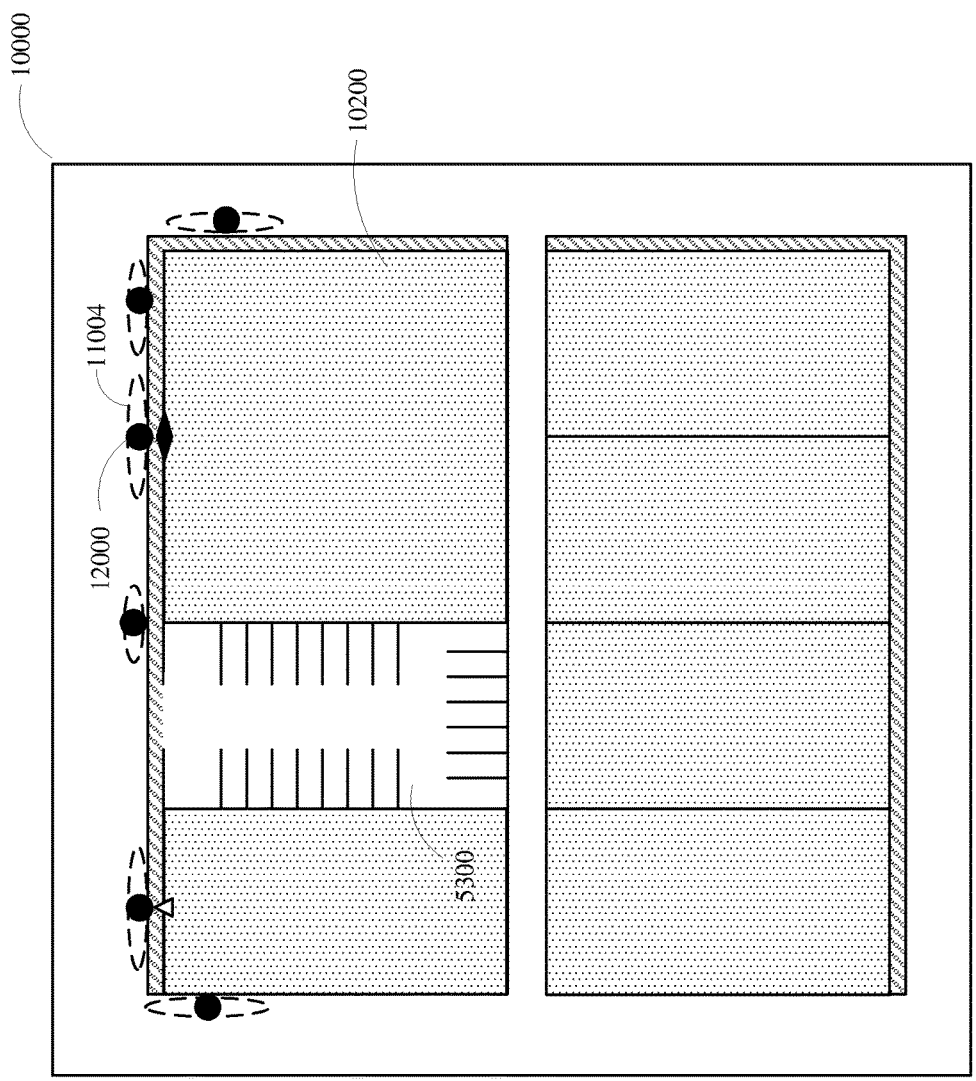
FIG. 12 is a diagram of a portion of a vehicle transportation network including docking locations based on docking location clusters in accordance with this disclosure.

FIGS. 10-12 are diagrams of a portion 10000 of a vehicle transportation network in accordance with this disclosure. The portion 10000 of the vehicle transportation network shown in FIGS. 10-12 corresponds with a portion of the portion of the vehicle transportation network shown in FIG. 5, proximate to the parking area 5300.

FIG. 10 is a diagram of a portion 10000 of a vehicle transportation network including candidate docking locations in accordance with this disclosure. In some embodiments, as shown in FIG. 10, the vehicle transportation network information representing the portion 10000 of the vehicle transportation network may include information representing navigable areas, such as a road 10100 at the top with a direction of travel from right to left, which may correspond with a westbound road, a road 10110 on the right side with a direction of travel from top to bottom, which may correspond with a southbound road, a road 10120 on the left side with a direction of travel from bottom to top, which may correspond with a northbound road, a road 10130 in the center with a direction of travel from left to right, which may correspond with an eastbound ally, and a road 10140 on the bottom with a direction of travel from left to right, which may correspond with an eastbound road. The vehicle transportation network information may include information representing non-navigable areas, such as a building 10200 in the upper right corner, and a building 10210 in the upper left corner. The X marks in FIG. 10 represent candidate docking locations automatically identified based on operating information for multiple vehicles.

In some embodiments, the vehicle transportation network information may include information representing a defined entrance location, such as the defined entrance location 10202 for the building 10200 in the upper right corner. In some embodiments, the vehicle transportation network information may include information representing a defined destination location, such as the defined destination location 10204 for the building 10200 in the upper right corner, which is indicated in FIG. 10 using a black square. In some embodiments, the vehicle transportation network information may include information representing an edge location for the destination. In some embodiments, the vehicle transportation network information may include information representing a predicted entrance location, such as the predicted entrance location 10212 for the building 10210 in the upper left corner.

In some embodiments, automatically generating the docking location information may include associating one or more of the candidate docking locations with a point of interest based on the vehicle transportation network information and the operating information. For example, the candidate docking locations in the upper left corner of FIG. 10 may be associated with the building 10210 in the upper left corner, and the candidate docking locations in the upper right corner may be associated with the building 10200 in the upper right corner. The candidate docking locations shown in the parking area 5300 may be associated with the parking area 5300, may be associated with a building based on proximity, or the candidate docking locations may be filtered to omit the candidate docking locations shown in the parking area 5300, as shown in FIGS. 11-12.

FIG. 11 is a diagram of a portion 10000 of a vehicle transportation network including docking location clusters in accordance with this disclosure. In some embodiments, automatically generating the docking location information may include generating one or more docking location clusters 11000/11002/11004/11006/11008/11010 for a point of interest based on the candidate docking locations associated with the point of interest. Each docking location cluster 11000/11002/11004/11006/11008/11010 may include multiple candidate docking locations. For example, the docking location cluster 11002 in the upper right includes four candidate docking locations.

In some embodiments, docking location clusters may be generated using, for example, k-means clustering. Generating the docking location clusters may include omitting one or more candidate docking locations associated with a point of interest from the docking location clusters. For example, the candidate docking locations along the right side may be associated with the building 10200, and generating the docking location cluster 11000 may include identifying the candidate docking location 11100 as an outlier and omitting the candidate docking location 11100 from the docking location cluster 11000.

In some embodiments, multiple docking location clusters may be associated with a point of interest. For example, the docking location clusters 11000/11002/11004/11006 may be associated with the building 10200, and the docking location clusters 11008/11010 may be associated with the building 10210.

FIG. 12 is a diagram of a portion 10000 of a vehicle transportation network including docking locations based on docking location clusters in accordance with this disclosure. In some embodiments, a docking location for a point of interest may be identified based on a docking location cluster associated with the point of interest. For example, a docking location identified based on a docking location cluster may correspond with a docking location cluster mean of the docking location cluster. In FIG. 12 a docking location cluster mean is shown for each of the docking location clusters shown in FIG. 10. However, determining a docking location cluster mean for one or more of the docking location clusters may be omitted. For example, a docking location cluster mean may be identified for a maximal docking location cluster for each point of interest. For example, the docking location cluster 11004 may include the greatest cardinality of candidate docking locations from among the docking location clusters associated with the building 10200, a docking location cluster mean 12000 may be identified for the docking location cluster 11004, and generating a docking location cluster mean for the other docking location clusters associated with the building 10200 may be omitted.

Figure 13:
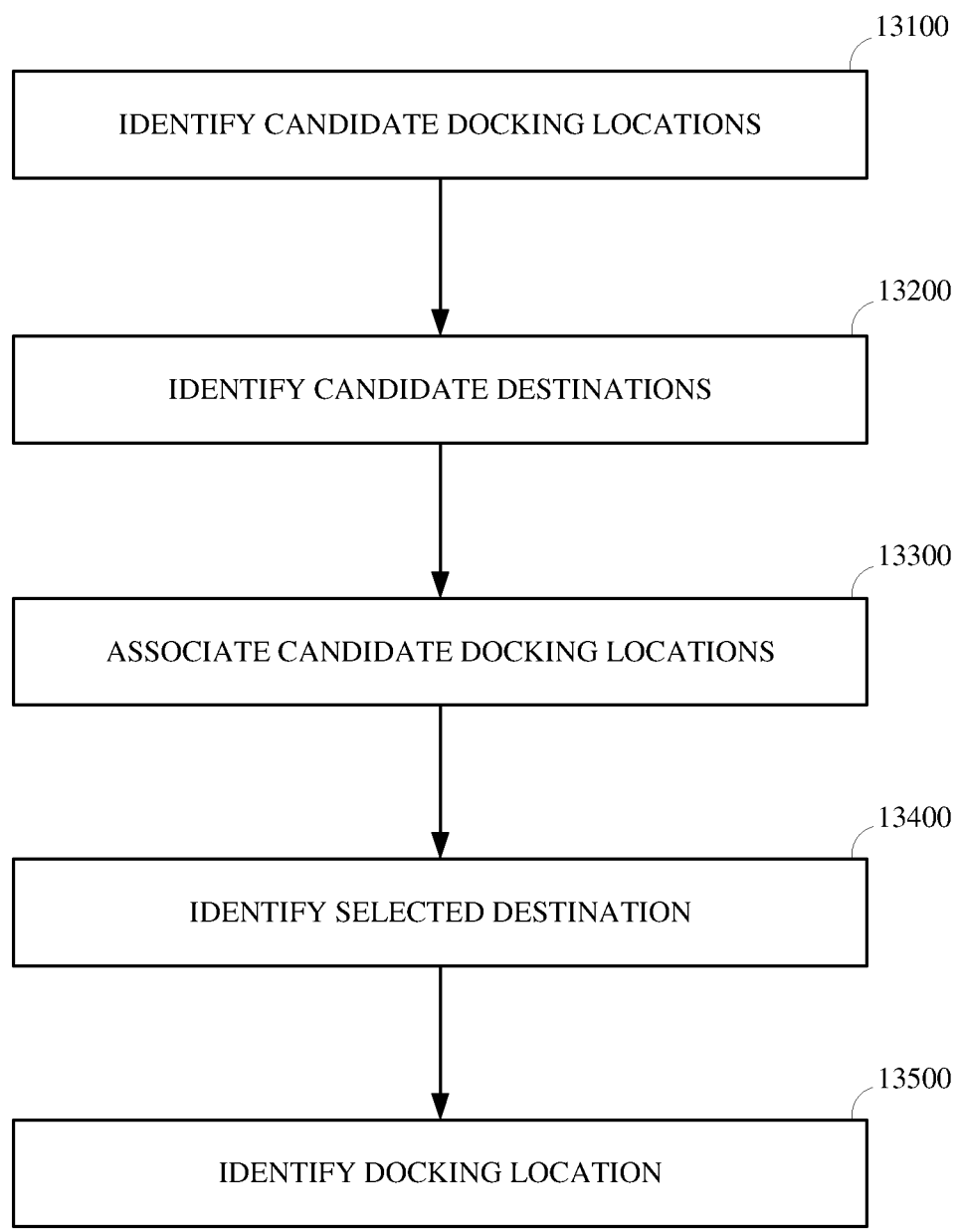
FIG. 13 is a diagram of a method of passenger docking location identification in accordance with this disclosure.

FIG. 13 is a diagram of a method of passenger docking location identification in accordance with this disclosure. Implementations of passenger docking location identification may include identifying candidate docking locations at 13100, identifying candidate destinations at 13200, associating the candidate docking locations with the candidate destinations at 13300, identifying a selected destination at 13400, identifying a docking location at 13500, or a combination thereof. In some embodiments, a candidate docking location may correspond with a docking operation performed at the target docking location and the selected destination may be the primary destination.

Candidate docking locations may be identified at 13100 based on operating information. For example, the candidate docking locations, such as the candidate docking locations shown in FIG. 10, may be identified as shown in FIGS. 7-9.

One or more candidate destinations may be identified at 13200 based on the vehicle transportation network information. Each point of interest in a portion of the vehicle transportation network may correspond with a candidate destination. For example, each building shown in FIG. 10 may be identified as a candidate destination.

Figure 14:
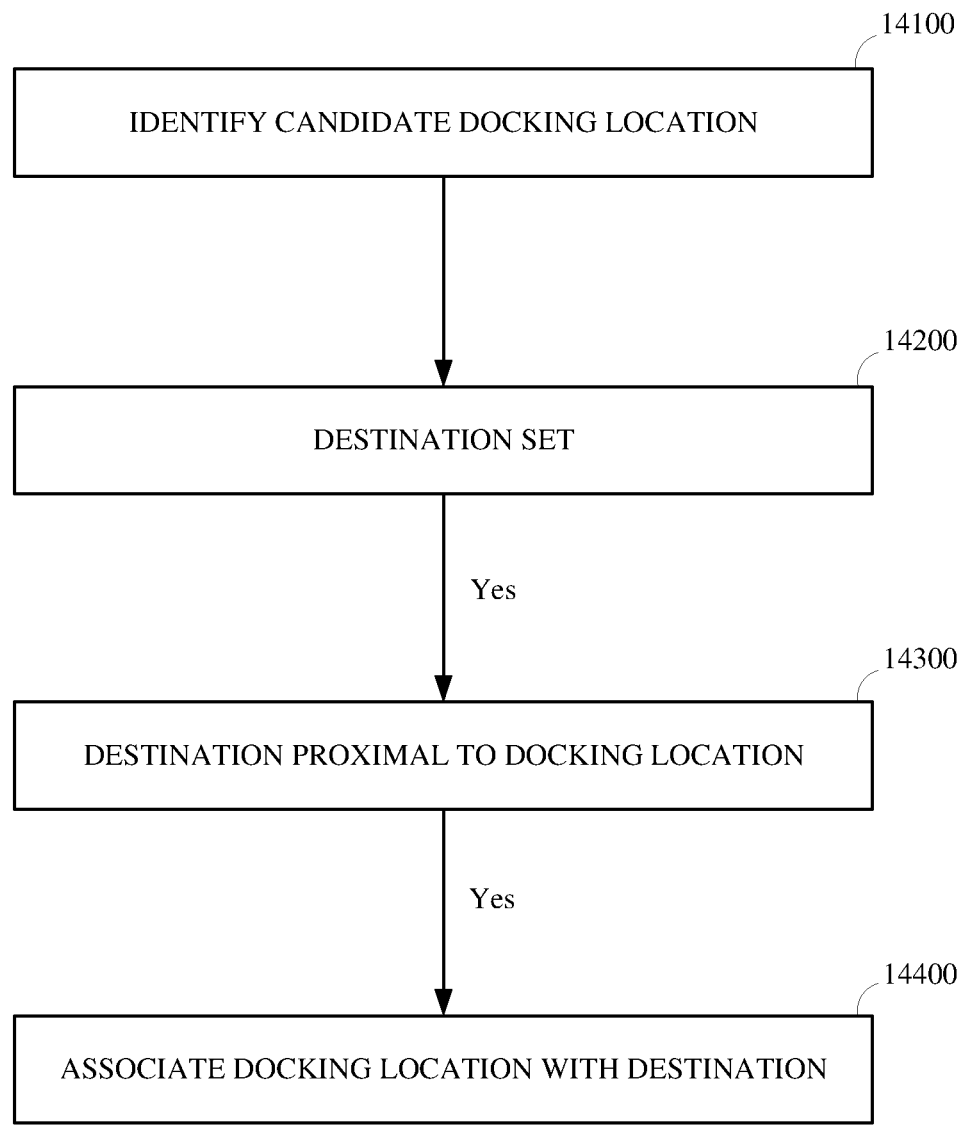
FIG. 14 is a diagram of a method of associating a candidate docking location with a defined destination in accordance with this disclosure.
Figure 15:
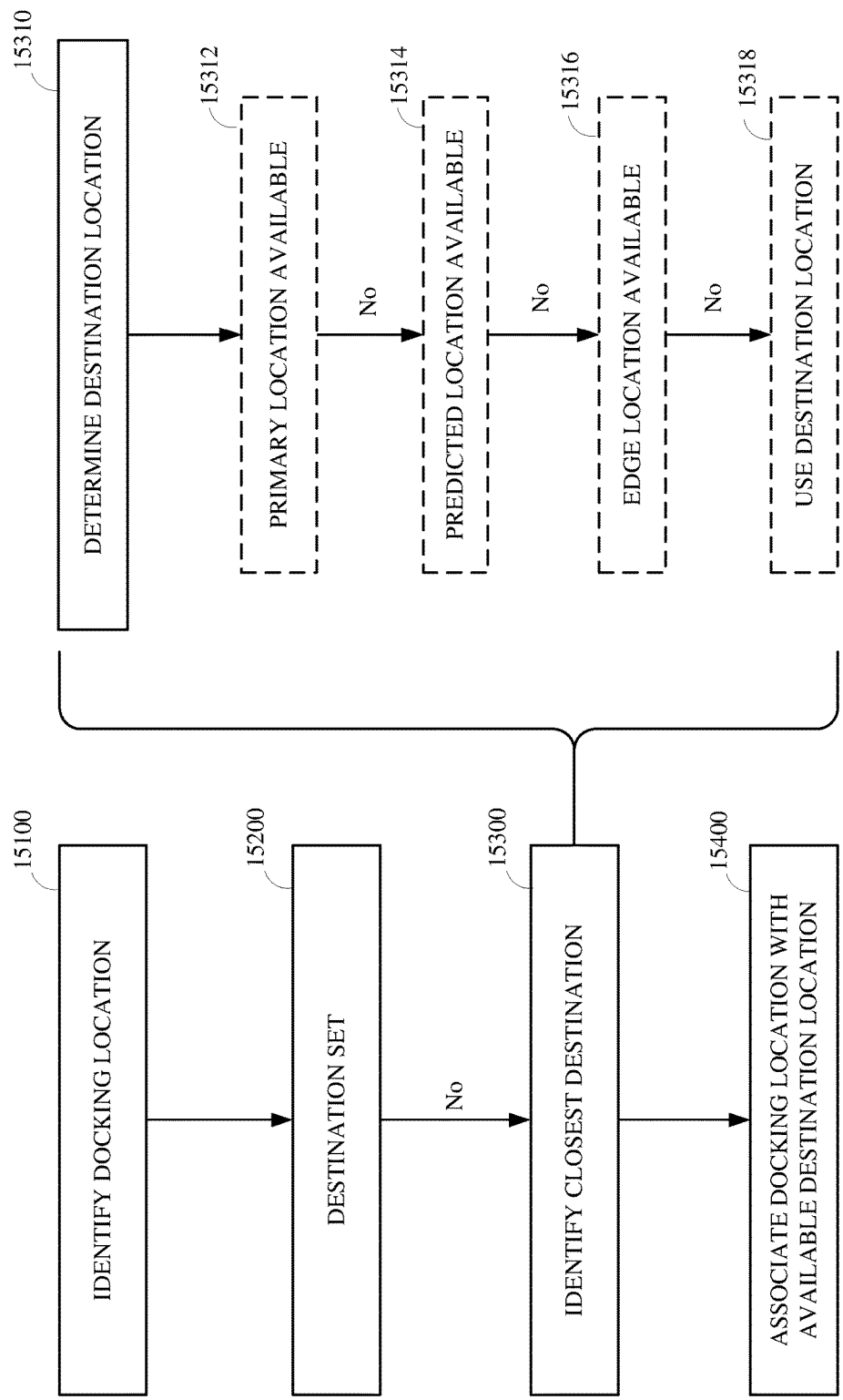
FIG. 15 is a diagram of a method of associating a candidate docking location with a candidate destination in accordance with this disclosure.

Each candidate docking location may be associated with a candidate destination at 13300 based on the vehicle transportation network information and the operating information. In some embodiments, a candidate docking location may be associated with a candidate destination based on proximity to a defined destination indicated in the operating information as shown in FIG. 14. In some embodiments, a candidate docking location may be associated with a candidate destination based on proximity as shown in FIG. 15.

Figure 16:
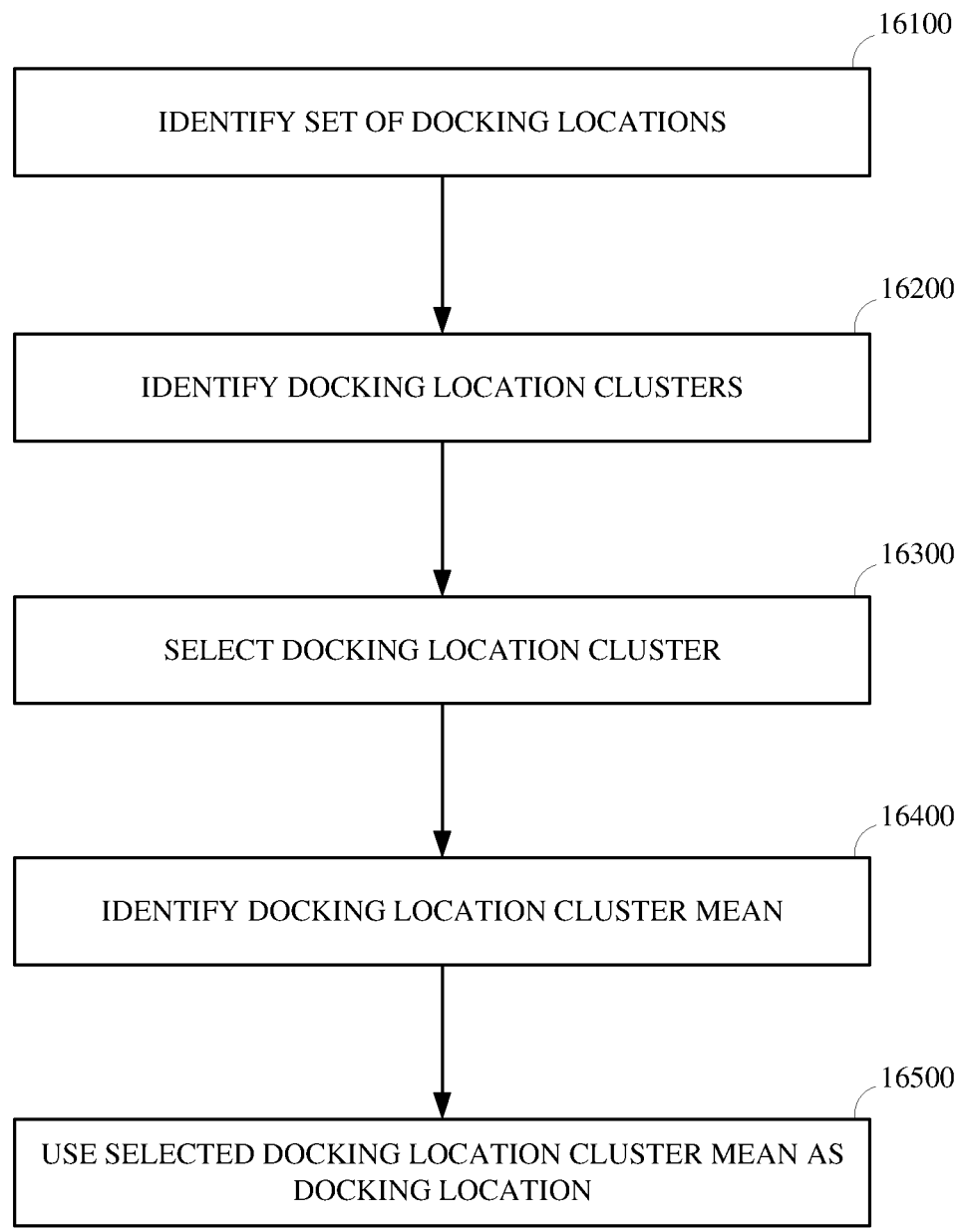
FIG. 16 is a diagram of a method of associating a docking location with a destination using docking location clusters in accordance with this disclosure.

In some embodiments, one or more docking locations may be identified for a selected destination based on the candidate docking locations associated with the selected destination. For example, a candidate destination may be identified as a selected destination at 13400, and a docking location for the selected destination may be identified at 13500 based on the candidate docking locations associated with the selected destination at 13300. In some implementations, identifying the docking location at 13500 may include using docking location clustering as shown in FIG. 16.

FIG. 14 is a diagram of a method of associating a candidate docking location with a defined destination in accordance with this disclosure. Implementations of associating a candidate docking location with a defined destination may include identifying a candidate docking location at 14100, determining whether the candidate docking location is associated with a destination defined in the operating information at 14200, determining whether the defined destination is proximal to the candidate docking location at 14300, associating the candidate docking location with the defined destination at 14400, or a combination thereof. In some embodiments, a candidate docking location may correspond with a docking operation performed at the target docking location and a candidate destination may be the primary destination.

A candidate docking location may be identified at 14100. For example, the candidate docking location may be identified based on the operating information as shown in FIGS. 6-9.

Whether the operating information corresponding to the candidate docking location indicates a defined destination may be determined at 14200. In some embodiments, the operating information corresponding to a candidate docking location may include a defined destination, which may identify a point of interest expressly identified as a destination. For example, a passenger or occupant of a vehicle represented in the operating information may input a point of interest as a destination in a navigation system of the vehicle, the operating information may indicate that the vehicle traveled to the defined destination during an identified time period, and the candidate docking location identified at 14100 may correspond with the identified time period.

The determination whether the operating information corresponding to the candidate docking location indicates a defined destination at 14200 may indicate that the operating information corresponding to the candidate docking location identified at 14100 indicates a defined destination, and whether the candidate docking location is proximal to the defined destination may be determined at 14300. For example, a distance between the candidate docking location and the defined destination may be within a defined threshold, and the determination may indicate that the candidate docking location is proximal to the defined destination. Although not shown in FIG. 14, in some embodiments, determining whether the distance between a candidate docking location and a defined destination may include identifying an available destination location for the defined destination as shown in FIG. 15.

The determination whether the candidate docking location is proximal to the defined destination at 14300 may indicate that the candidate docking location is proximal to the defined destination, and the candidate docking location may be associated with the defined destination at 14400. In some embodiments, the determination whether the candidate docking location is proximal to the defined destination at 14300 may indicate that the candidate docking location is not proximal to the defined destination, and the candidate docking location may be associated with a destination as shown in FIG. 15.

FIG. 15 is a diagram of a method of associating a candidate docking location with a candidate destination in accordance with this disclosure. Implementations of associating a candidate docking location with a candidate destination may include identifying a candidate docking location at 15100, determining whether the candidate docking location is associated with a destination defined in the operating information at 15200, identifying a proximal candidate destination at 15300, associating the candidate docking location with the proximal candidate destination at 15400, or a combination thereof. In some embodiments, a candidate docking location may correspond with a docking operation performed at the target docking location and a candidate destination may be the primary destination.

A candidate docking location may be identified at 15100. For example, the candidate docking location may be identified based on the operating information as shown in FIGS. 6-9.

Whether the operating information corresponding to the candidate docking location indicates a defined destination may be determined at 15200. The determination at 15200 may be similar to the determination at 14200 as shown in FIG. 14.

The determination whether the operating information corresponding to the candidate docking location indicates a defined destination at 15200 may indicate that the operating information corresponding to the candidate docking location identified at 15100 omits a defined destination, and a proximal candidate destination may be identified at 15300.

In some embodiments, identifying a proximal candidate destination at 15300 may include evaluating one or more candidate destinations to identify the candidate destination spatially closest to the candidate docking location. Each point of interest in a portion of the vehicle transportation network may correspond with a candidate destination. For example, each building shown in FIG. 10 may be identified as a candidate destination.

In some embodiments, the candidate docking location identified at 15100 may be proximate, such as within a defined association proximity threshold, to a candidate destination, the distance between the candidate docking location and other candidate destinations, may exceed the defined association proximity, and the candidate docking location may be associated with the proximate candidate destination.

In some embodiments, the candidate docking location may be proximate to multiple candidate destinations, and the candidate docking location may be associated with a candidate destination such that a distance between the candidate docking location and the candidate destination is minimized.

For example, the distance between the candidate docking location and the candidate destination may be minimized by determining a distance between the candidate docking location and each candidate destination respectively using the vehicle transportation network information, and associating the candidate destination corresponding to the minimal distance with the candidate docking location.

In some embodiments, identifying a proximal candidate destination at 15300 may include evaluating the vehicle transportation network information to identify a destination location for each candidate destination at 15310. In some embodiments, evaluating identifying a destination location for a candidate destination at 15310 may include identifying an available destination location for the candidate destination.

In some embodiments, identifying an available destination location for the candidate destination may include determining whether a primary location is available for the candidate destination at 15312. For example, the vehicle transportation network information may indicate a primary location, such as a defined entrance location, for the candidate destination, and the defined entrance location may be used as the available destination location.

Figure 21:
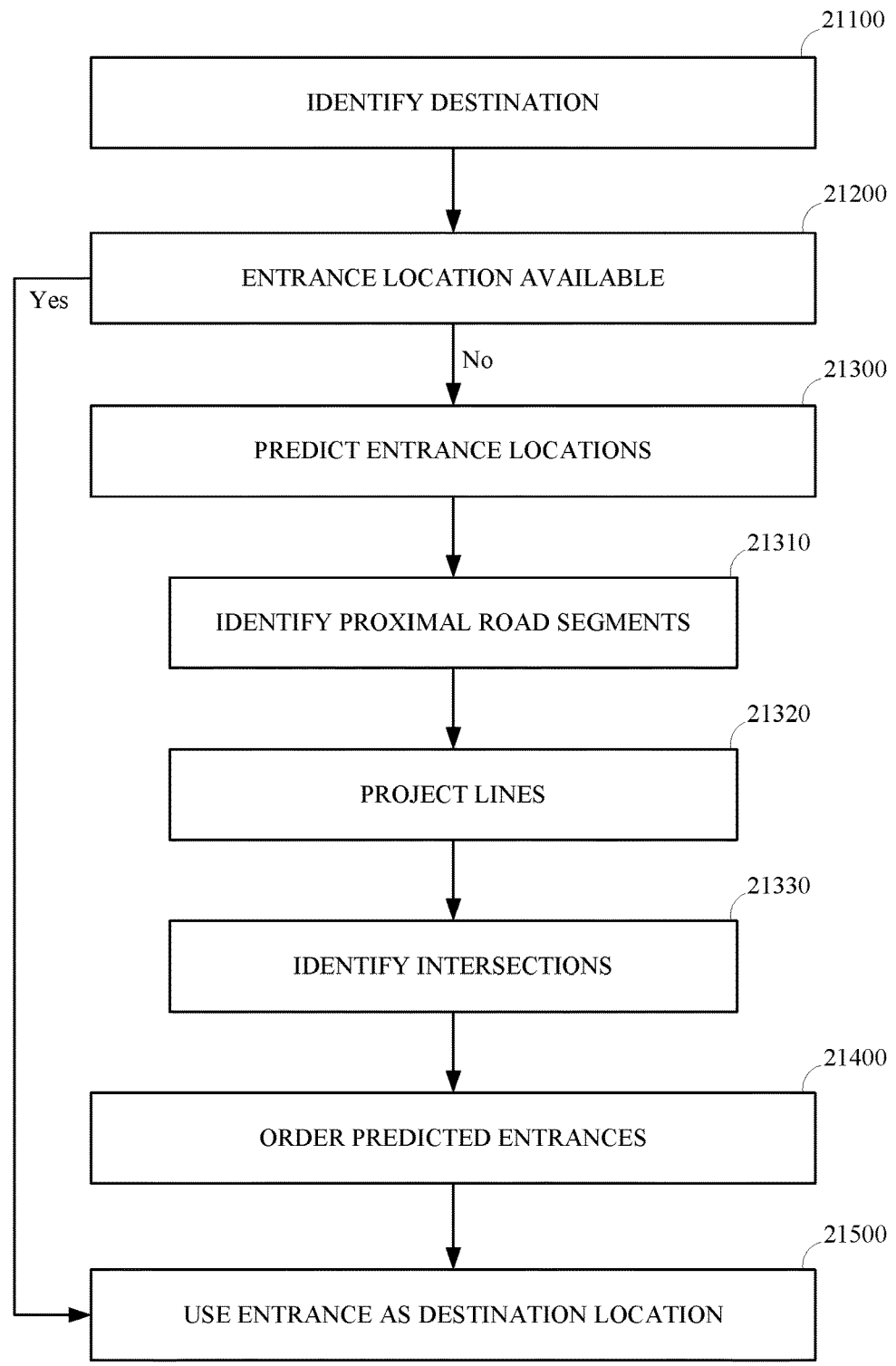
FIG. 21 is a diagram of a method of identifying an entrance location in accordance with this disclosure.

In some embodiments, a primary location for the candidate destination may be unavailable, and identifying an available destination location for the candidate destination may include determining whether a predicted location is available for the candidate destination at 15314. For example, a predicted location may be identified based on the vehicle transportation network information. In some embodiments, the predicted location may be identified based on the vehicle transportation network information as shown in FIG. 21.

In some embodiments, a primary location and a predicted location for the candidate destination may be unavailable, and identifying an available destination location for the candidate destination may include determining whether an edge location is available for the candidate destination at 15316 based on the vehicle transportation network information. In some embodiments, the vehicle transportation network information may expressly identify edge information. For example, the vehicle transportation network information may indicate a location of an edge of a building. In some embodiments, the vehicle transportation network information may omit an expressly identified edge location and a predicted edge location may be determined. For example, the candidate destination may be a building, the vehicle transportation network information may identify a location for the building, may indicate a road immediately adjacent to the building, may identify a location for at least a portion of the road, and an edge location for the building may be determined based on the location of the building and the location of the road.

In some embodiments, a primary location, a predicted location, and an edge location, for the candidate destination may be unavailable, and identifying an available destination location for the candidate destination may include using a point of interest location for the candidate destination at 15318 based on the vehicle transportation network information. For example, the based on the vehicle transportation network information may indicate a location, such as a street address, a postal address, a vehicle transportation network address, or a GPS address, for the candidate destination.

A proximal candidate destination may be identified at 15300 and the candidate docking location may be associated with the proximate candidate destination at 15400.

FIG. 16 is a diagram of a method of associating a docking location with a destination using docking location clusters in accordance with this disclosure. Implementations of associating a candidate docking location with a destination using docking location clusters may include identifying a set of candidate docking locations at 16100, identifying one or more docking location clusters at 16200, selecting a docking location cluster at 16300, identifying a docking location cluster mean at 16400, associating a docking location with a destination at 16500, or a combination thereof. In some embodiments, the docking location may correspond with a docking operation performed at the target docking location and the destination may be the primary destination.

A set of candidate docking locations may be identified at 16100. In some embodiments, the set of candidate docking locations may include the candidate docking locations associated with the destination. For example, FIG. 10 shows examples of candidate docking locations that may be associated with a destination, and the candidate docking locations may be associated with the destination as shown in FIGS. 14-15.

In some embodiments, one or more docking location clusters may be identified at 16200. A docking location cluster may include multiple candidate docking locations from the set of candidate docking locations. For example, FIG. 11 shows examples of docking location clusters. In some embodiments, docking location clusters may be generated using, for example, k-means clustering. Generating the docking location clusters may include omitting one or more candidate docking locations associated with a point of interest from the docking location clusters. For example, the candidate docking locations shown along the right side in FIG. 11 may be associated with the building 10200 shown in FIG. 11, and generating the docking location cluster 11000 shown in FIG. 11 may include identifying the candidate docking location 11100 shown in FIG. 11 as an outlier and omitting the candidate docking location 11100 shown in FIG. 11 from the docking location cluster 11000 shown in FIG. 11. In some embodiments, multiple docking location clusters may be associated with a destination. For example, the docking location clusters 11000/11002/11004/11006 shown in FIG. 11 may be associated with the building 10200 shown in FIG. 11, and the docking location clusters 11008/11010 shown in FIG. 11 may be associated with the building 10210 shown in FIG. 11.

In some embodiments, a docking location cluster may be selected at 16300. For example, a destination may be associated with multiple docking location clusters, and a docking location cluster including the largest cardinality of candidate docking locations, which may be the docking location cluster having the maximal size. In some embodiments, selecting a docking location cluster may include determining a size, which may indicate a count or cardinality of candidate docking locations, for each docking location cluster associated with a destination. For example, the docking location cluster 11100 shown in FIG. 11 includes eight (8) candidate docking locations and the docking location cluster 11200 shown in FIG. 11 includes ten (10) candidate docking locations. In some embodiments, selecting the docking location cluster for a destination may include selecting the docking location cluster having the maximum cardinality from the docking location clusters associated with the destination. In some embodiments, the docking location clusters may be ordered or ranked based on size.

In some embodiments, a docking location cluster a mean, median, or average may be identified at 16400. For example, the docking location cluster 11004 shown in FIG. 11 may be identified as the selected docking location cluster at 16300, and a mean, median, or average of the candidate docking locations included in the docking location cluster may be identified as the docking location cluster mean, as shown at 12000 in FIG. 12. In some embodiments, a docking location cluster mean may be identified for each docking location cluster associated with a destination.

A docking location may be associated with a destination at 16500. For example, the docking location cluster 11004 shown in FIG. 11 may be identified as the selected docking location cluster at 16300, the docking location cluster mean 12000 shown in FIG. 12 may be identified as the docking location cluster mean at 16400, and a docking location corresponding to the docking location cluster mean may be associated with the destination at 16500. In some embodiments, a docking location cluster mean may be identified for each docking location cluster associated with a destination, and a docking location corresponding to each docking location cluster mean respectively may be associated with the destination. In some embodiments, the docking locations may be ordered or ranked based on the cardinality of the corresponding docking location clusters.

Figure 17:
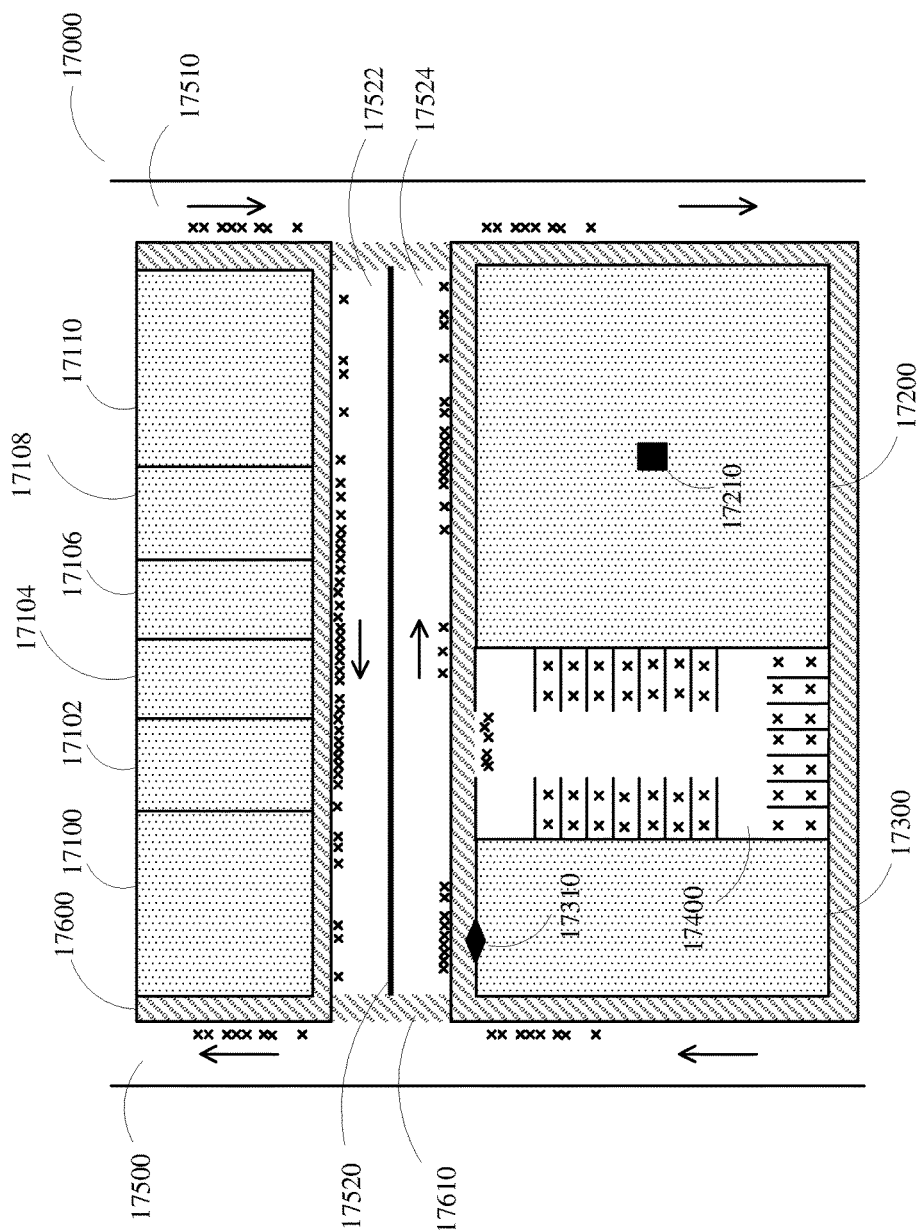
FIG. 17 is a diagram of a portion of a vehicle transportation network including candidate docking locations in accordance with this disclosure.
Figure 18:
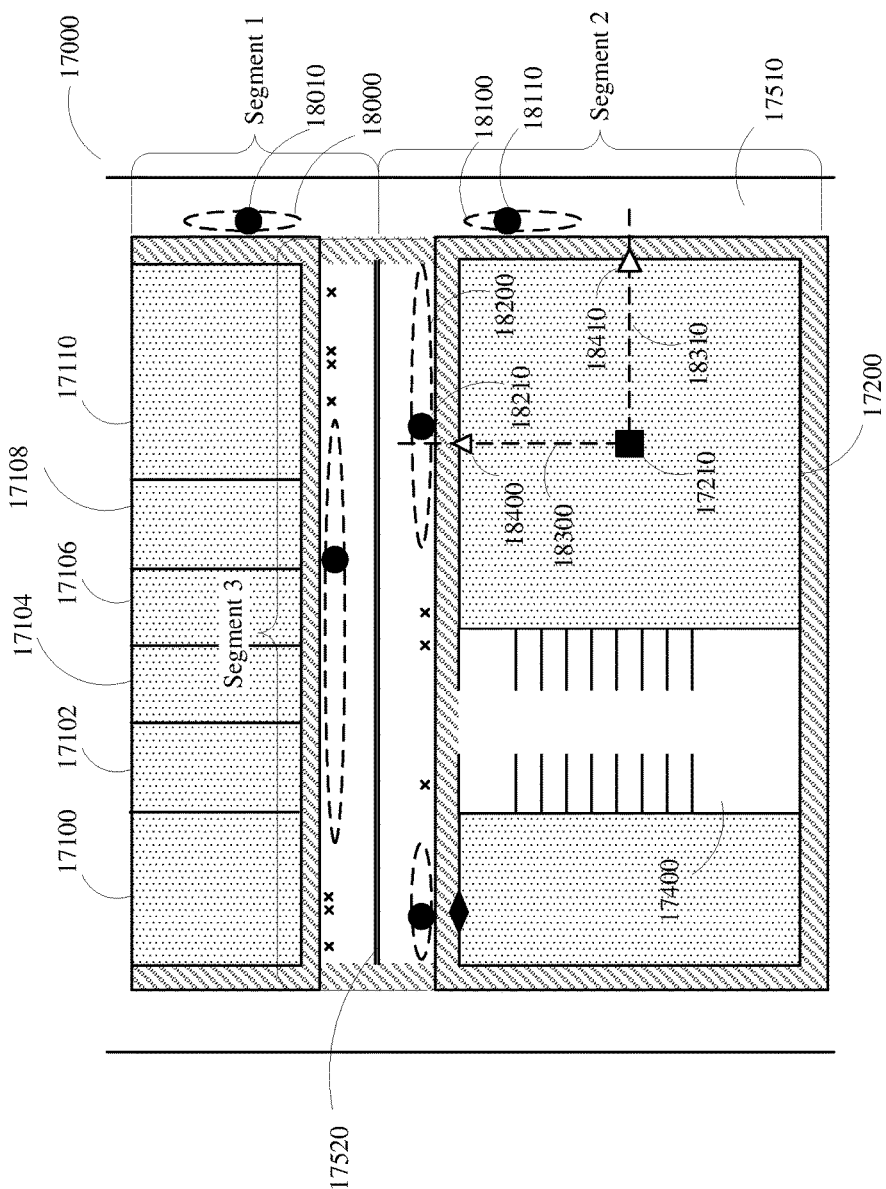
FIG. 18 is a diagram of a portion of a vehicle transportation network including road segments in accordance with this disclosure.
Figure 19:
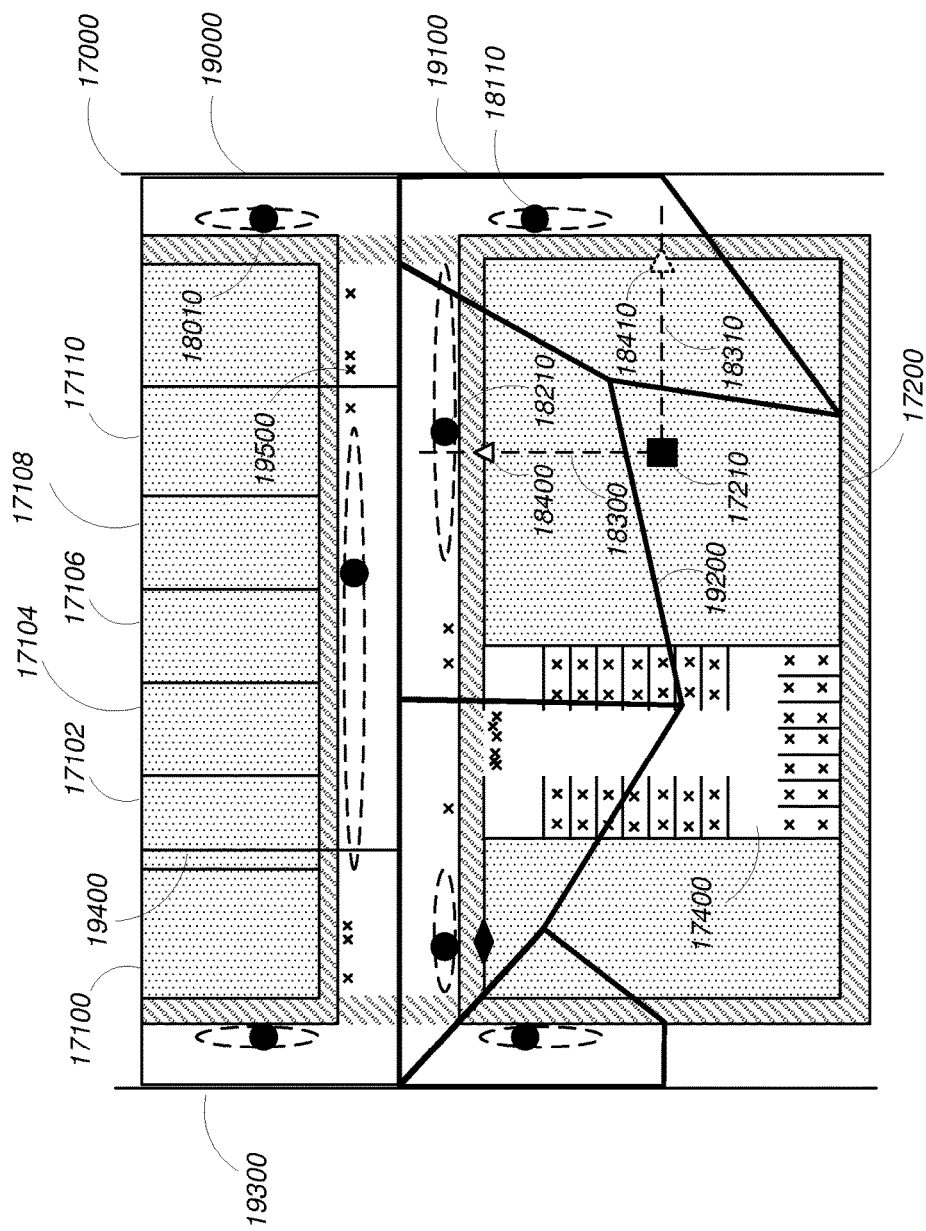
FIG. 19 is a diagram of a portion of a vehicle transportation network including vehicle transportation network regions in accordance with this disclosure.

FIGS. 17-19 are diagrams of another portion 17000 of a vehicle transportation network in accordance with this disclosure. The portion 17000 of the vehicle transportation network shown in FIGS. 17-19 corresponds with a portion similar to the portion of the vehicle transportation network shown in FIG. 5.

FIG. 17 is a diagram of a portion 17000 of a vehicle transportation network including candidate docking locations in accordance with this disclosure. As shown, the portion 17000 of the vehicle transportation network includes a buildings 17100-17110 at the top, a building 17200 at the bottom right, a building 17300 at the bottom left, a parking area 17400, a road 17500 at the left having a direction of travel from the bottom to the top, a road 17510 at the right having a direction of travel from the top to the bottom, a road 17520 in the center including a lane 17522 having a direction of travel from right to left and a lane 17524 having a direction of travel from left to right. FIG. 17 includes X marks indicating candidate docking locations. The building 17200 at the bottom right includes a defined destination location 17210 indicated by a black square, and the building 17300 at the bottom left includes a defined entrance 17310 indicated by a black diamond. The portion 17000 of the vehicle transportation network includes pedestrian navigable areas, which are indicated using diagonal lines, such as the pedestrian walkway 17600 adjacent to the buildings 17100-17110 at the top, and the pedestrian crossway 17610 crossing the road 17520 in the center.

FIG. 18 is a diagram of a portion 17000 of a vehicle transportation network including road segments in accordance with this disclosure. In some embodiments, associating candidate docking locations with a destination may include identifying one or more road segments. In some implementations, the vehicle transportation network information may include road segment information representing a plurality of road segments in the vehicle transportation network. For example, the road 17510 on the right may include a first road segment (segment 1) at the top and a second road segment (segment 2) at the bottom, and the road 17520 in the center may include a third road segment (segment 3). The first road segment (segment 1) includes a first docking location cluster 18000, which includes a first docking location cluster median 18010. The second road segment (segment 2) includes a second docking location cluster 18100, which includes a second docking location cluster median 18110. The third road segment (segment 3) includes a third docking location cluster 18200, which includes a third docking location cluster median 18210, a fourth docking location cluster, which includes a fourth docking location cluster median, and a fifth docking location cluster, which includes a fifth docking location cluster median. For simplicity and clarity, candidate docking locations, segments, docking location clusters, and docking location cluster medians for the road on the left are omitted from FIG. 18.

In some embodiments, predicted entrance locations may be generated for a destination as shown in FIG. 21. FIG. 18 shows a line 18300 projected from the defined destination location 17210 perpendicular to the third segment (segment 3), a line 18310 projected from the defined destination location 17210 perpendicular to the second segment (segment 2), a predicted entrance 18400 corresponding to the intersection of the line 18300 projected from the defined destination location 17210 perpendicular to the third segment (segment 3), and a predicted entrance 18410 corresponding to the intersection of the line 18310 projected from the defined destination location 17210 perpendicular to the second segment (segment 2).

FIG. 19 is a diagram of a portion 17000 of a vehicle transportation network including vehicle transportation network regions in accordance with this disclosure. For clarity and simplicity, the vehicle transportation network regions, such as the vehicle transportation network region 19000 at the top right, the vehicle transportation network region 19100 at the bottom right, the vehicle transportation network region 19200 at the center right, and the vehicle transportation network region 19300 at the top left, are indicated using bold lines in FIG. 19. A candidate docking location 19500 is shown at the left of the vehicle transportation network region 19000 at the top right.

The vehicle transportation network regions may include navigable areas, such as roads, partially navigable areas, such as the parking area 17400, unnavigable areas, such as the buildings 17100-17110/17200, or any other part or parts of the vehicle transportation network. The vehicle transportation network regions may be any regular or irregular shape. For simplicity and clarity, one or more of the vehicle transportation network regions for the portion 17000 of the vehicle transportation network are omitted from FIG. 19.

In some embodiments, a vehicle transportation network region may include a destination, or a portion of a destination, and a docking location cluster median for the vehicle transportation network region may be associated with the destination as the docking location for the destination. In some embodiments, a destination, such as the building 17200 at the bottom right, or a portion thereof, may be included in multiple vehicle transportation network regions, such as the vehicle transportation network region 19100 at the bottom right and vehicle transportation network region 19200 at the center right. In some embodiments, multiple destinations, such as the buildings 17102-17110 at the top, or portions thereof, may be included in a vehicle transportation network region, such as the vehicle transportation network region 19400 in the center.

Figure 20:
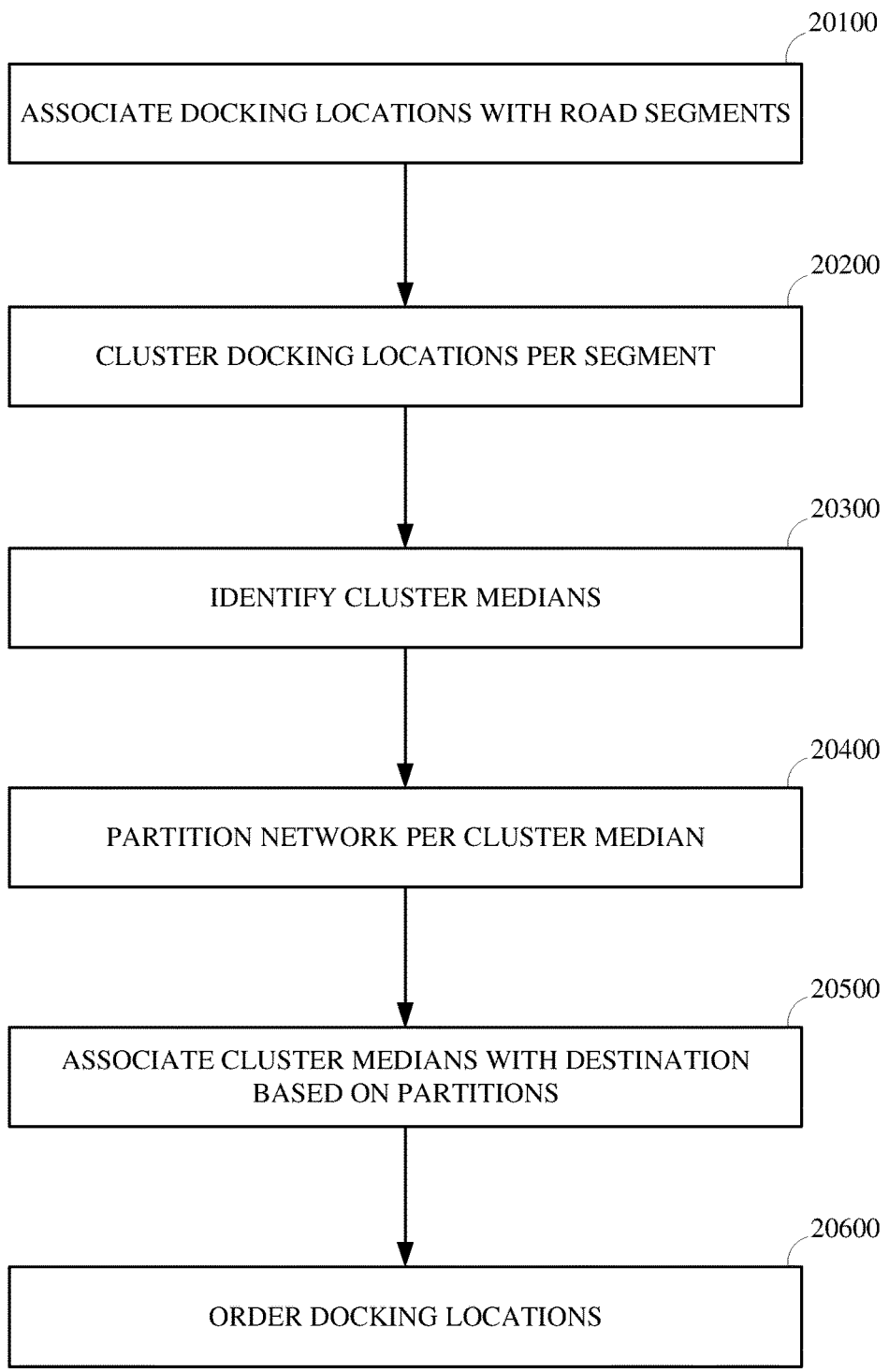
FIG. 20 is a diagram of a method of associating a candidate docking location with a candidate destination using partitioning in accordance with this disclosure.

FIG. 20 is a diagram of a method of associating a candidate docking location with a candidate destination using network partitioning in accordance with this disclosure. Implementations of associating a candidate docking location with a candidate destination using network partitioning may include associating candidate docking locations with road segments at 20100, generating docking location clusters for the segments at 20200, identifying docking location cluster medians at 20300, partitioning the vehicle transportation network at 20400, associating docking location cluster medians with destinations based on the partitioning at 20500, ordering docking locations at 20600, or a combination thereof. In some embodiments, a candidate docking location may correspond with a docking operation performed in a docking location cluster corresponding to the target docking location and the destination associated with the docking location cluster median may be the primary destination.

In some embodiments, candidate docking locations may be associated with road segments at 20100. For example, the vehicle transportation network information may include road segment information identifying road segments, such as the road segments shown in FIG. 18, and the candidate docking locations, such as the candidate docking locations shown in FIG. 17, may be associated with the corresponding road segments based on the vehicle transportation network information and the operating information.

In some embodiments, docking location clusters may be determined at 20200 for the road segments identified at 20100. For example, docking location clusters, such as the docking location clusters shown in FIGS. 18-19, may be determined on a per segment bases. Determining docking location clusters for the road segments may be similar to identifying docking location clusters as shown at 16200 in FIG. 16, except that a docking location cluster generated for a segment may omit candidate docking locations omitted from the segment.

In some embodiments, docking location cluster medians may be identified at 20300. For example, the docking location cluster 18000 shown in FIGS. 18-19 may be identified at 20200 for the first segment (segment 1), and a mean, median, or average of the candidate docking locations included in the docking location cluster 18000 may be identified as the docking location cluster median 18010; the docking location cluster 18100 shown in FIGS. 18-19 may be identified at 20200 for the second segment (segment 2), and a mean, median, or average of the candidate docking locations included in the docking location cluster 18100 may be identified as the docking location cluster median 18110; and the docking location cluster 18200 shown in FIGS. 18-19 may be identified at 20200 for the third segment (segment 3), and a mean, median, or average of the candidate docking locations included in the docking location cluster 18200 may be identified as the docking location cluster median 18210.

In some embodiments, the vehicle transportation network may be partitioned at 20400 to determine vehicle transportation network regions, such as the vehicle transportation network region 19000, the vehicle transportation network region 19100, or the vehicle transportation network region 19200 shown in FIG. 19. In some embodiments, the vehicle transportation network may be partitioned based on the docking location cluster medians identified at 20300. For example, the vehicle transportation network region 19000 may be partitioned based on the docking location cluster median 18010, the vehicle transportation network region 19100 may be partitioned based on the docking location cluster median 18110, and the vehicle transportation network region 19200 may be partitioned based on the docking location cluster median 18210. In some embodiments, each vehicle transportation network region may include one docking location cluster median. Each vehicle transportation network region may include multiple location points from the vehicle transportation network. A location point may indicate any identifiable location within the vehicle transportation network.

In some embodiments, partitioning the vehicle transportation network may include identifying the vehicle transportation network regions based on proximity with the corresponding docking location cluster median. For example, the vehicle transportation network information representing the vehicle transportation network regions may be expressed as a Voronoi diagram, wherein the docking location cluster medians may be seeds for respective vehicle transportation network regions. In some embodiments, the distance between a location point in one vehicle transportation network region and the docking location cluster median for the vehicle transportation network region may be within the distance between the location point and the other docking location cluster medians. For example, the distance between any location point in the vehicle transportation network region 19100 shown at the bottom right of FIG. 19 and the docking location cluster median 18110 in the vehicle transportation network region 19100 may be within the distance between the respective location point and any other docking location cluster median.

In some embodiments, the distance between a location point and a docking location cluster median may be determined based on estimated pedestrian travel time. In some embodiments, the estimated pedestrian travel time may be determined based on pedestrian transportation network information. For example, the pedestrian transportation network information may represent the pedestrian navigable areas shown in FIGS. 17-19.

In a first example, a pedestrian may travel, via pedestrian navigable areas, from a location in the pedestrian navigable area immediately adjacent to the candidate docking location 19500 at the left of the vehicle transportation network region 19000 at the top right, to a location in the pedestrian navigable area immediately adjacent to the docking location cluster median 18010 in the vehicle transportation network region 19000 at the top right. For example, the pedestrian may travel via the sidewalk immediately adjacent to the buildings 17100-17110.

In a second example, a pedestrian may travel, via pedestrian navigable areas, from the location in the pedestrian navigable area immediately adjacent to the candidate docking location 19500 at the left of the vehicle transportation network region 19000 at the top right, to a location in the pedestrian navigable area immediately adjacent to the docking location cluster median 18210 in the vehicle transportation network region 19200 at the center right. For example, the pedestrian may travel via the sidewalk immediately adjacent to the buildings 17100-17110 at the top, the crosswalk at the right side, and the sidewalk immediately adjacent the to the building 17200 at the bottom right.

The geographic distance between the candidate docking location 19500 at the left of the vehicle transportation network region 19000 at the top right and the location in the pedestrian navigable area immediately adjacent to the docking location cluster median 18210 in the vehicle transportation network region 19200 at the center right may be within the geographic distance between the candidate docking location 19500 at the left of the vehicle transportation network region 19000 at the top right and the location in the pedestrian navigable area immediately adjacent to the docking location cluster median 18010 in the vehicle transportation network region 19000 at the top right.

The estimated pedestrian travel time between the candidate docking location 19500 at the left of the vehicle transportation network region 19000 at the top right and the location in the pedestrian navigable area immediately adjacent to the docking location cluster median 18010 in the vehicle transportation network region 19000 at the top right may be within the estimated pedestrian travel time between the candidate docking location 19500 at the left of the vehicle transportation network region 19000 at the top right and the location in the pedestrian navigable area immediately adjacent to the docking location cluster median 18210 in the vehicle transportation network region 19200 at the center right.

In some embodiments, docking locations may be associated with destinations at 20500. In some embodiments, a docking location corresponding to the docking location cluster median for the vehicle transportation network region including a destination may be associated with the destination. For example, the vehicle transportation network region 19300 at the top left includes the building 17100 shown at the top left in FIG. 19, and the docking location cluster median for the vehicle transportation network region 19300 may be identified as the docking location for the building 17100 shown at the top left in FIG. 19.

In some embodiments, the docking locations may be associated with destinations based on available location information. For example, a location of an entrance for a building may be determined based on the available location information, and docking locations may be associated with the destinations based on the determined entrance locations. In some embodiments, the available location information may be identified as shown in FIG. 15, which may include generating a predicted entrance location as shown in FIG. 21.

In some embodiments, multiple vehicle transportation network regions may include a portion of a destination, and one or more docking locations may be associated with the destination based on entrance location information.

For example, as shown in FIG. 19, the vehicle transportation network region 19100 at the bottom right includes a portion of the building 17200 at the bottom right, which includes the predicted entrance location 18410 at the right edge of the building, and a docking location corresponding to the docking location cluster median 18110 of the vehicle transportation network region 19100 may be associated with the predicted entrance location 18410. The vehicle transportation network region 19200 at the center right includes a portion of the building 17200, which includes the predicted entrance location 18400 at the top edge of the building, and a docking location corresponding to the docking location cluster median 18210 of the vehicle transportation network region 19200 may be associated with the predicted entrance location 18400.

In some embodiments, the docking locations associated with a destination may be ordered or ranked at 20600. In some embodiments, the docking locations associated with a destination may be ordered based on estimated pedestrian travel time. For example, as shown in FIG. 19, the estimated pedestrian travel time between the docking location corresponding to the docking location cluster median 18110 and the associated predicted entrance location 18410 may be greater than the estimated pedestrian travel time between the docking location corresponding to the docking location cluster median 18210 and the associated predicted entrance location 18400, and the docking location corresponding to the docking location cluster median 18210 may be ranked or ordered higher than the docking location corresponding to the docking location cluster median 18110.

FIG. 21 is a diagram of a method of identifying an entrance location in accordance with this disclosure. Implementations of identifying an entrance location may include identifying a destination at 21100, determining whether a defined entrance location is available for the destination at 21200, generating predicted entrance locations at 21300, ordering the predicted entrance locations at 21400, identifying an entrance location as the destination location at 21500, or a combination thereof. In some embodiments, a docking location cluster median may correspond with the target docking location and the destination may be the primary destination.

In some embodiments, a destination may be identified at 21100. Identifying a destination may include identifying a defined destination location indicated in the vehicle transportation network information for the destination, such as a street address, a postal address, a vehicle transportation network address, or a GPS address. For example, the defined destination location 17210 shown in FIGS. 17-19 may be identified as the defined destination location for the building 17200 shown in FIGS. 17-19.

In some embodiments, whether a defined entrance location is available for the destination may be determined at 21200. For example, the vehicle transportation network information may include defined entrance location information for the destination.

In some embodiments, the vehicle transportation network information may omit defined entrance location information for the destination, and one or more predicted entrance locations may be generated for the destination at 21300 based on the vehicle transportation network information. In some embodiments, generating predicted entrance locations for the destination based on the vehicle transportation network information may include identifying road segments at 21310, projecting lines at 21320, identifying intersections at 21330, or a combination thereof.

In some embodiments, one or more road segments proximal to the defined destination location identified at 21100 may be identified at 21310. FIG. 18 shows an example of a portion of a transportation network including road segments. In some embodiments, the road segments may be indicated in the vehicle transportation network information. For example, a linear distance between a road segment and the defined destination location may be within a defined threshold, and the road segment may be proximal to the destination. For example, the second segment (segment 2) and the third segment (segment 3) shown in FIG. 18 may be proximal to the defined destination location 17210 shown in FIG. 18.

In some embodiments, lines may be projected at 21320. For example, for each road segment identified at 21310, a line, which may be perpendicular to the respective road segment, may be projected from the defined destination location identified at 21100. In FIGS. 18-19 projected lines are indicated using broken lines. FIGS. 18-19 include a line 18300 projected perpendicular to the third segment (segment 3) from the defined destination location 17210, which intersects with the third segment (segment 3), and a line 18310 projected perpendicular to the second segment (segment 2) from the defined destination location 17210, which intersects with the second segment (segment 2).

Each intersection between the lines projected at 21320 and the road segments identified at 21310 may be identified as a predicted entrance location for the destination at 21330. For example, in FIGS. 18-19, the intersection between the projected line 18300 and the third segment (segment 3) may be identified as a predicted entrance location 18400 for the destination, and the intersection between the projected line 18310 and the second segment (segment 2) may be identified as a predicted entrance location 18410 for the destination. In some embodiments, a predicted entrance location may correspond with an edge of a destination along a projected line that intersects with a road segment. For example, the predicted entrance locations 18400/18410 in FIGS. 18-19 correspond with respective edges of the building 17200 along the projected lines 18300/18310 perpendicular to the respective segments.

The entrance locations, which may include defined entrance locations or predicted entrance locations, may be associated with docking locations for the building at 21400, as shown in FIG. 20.

Figure 22:
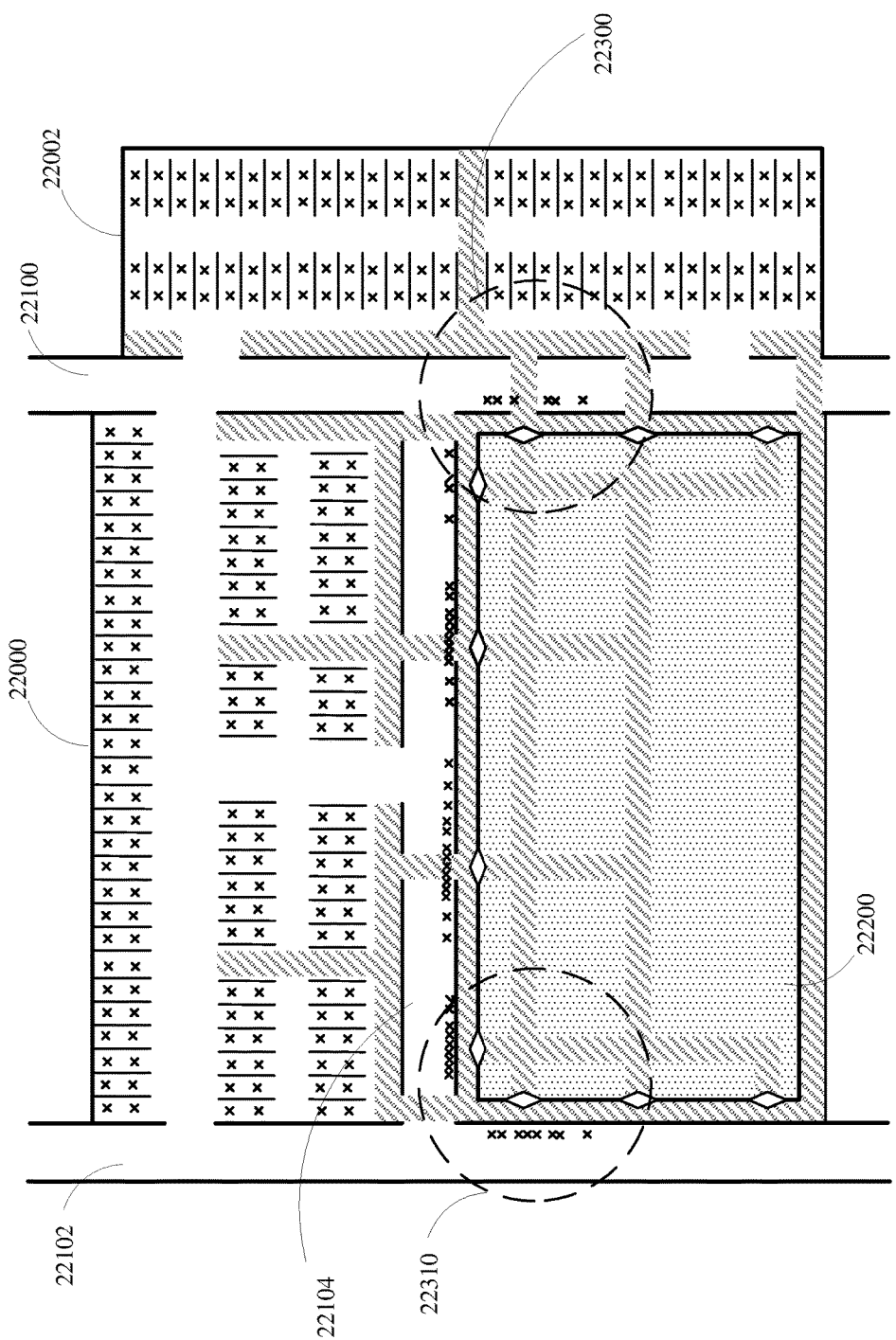
FIG. 22 is a diagram of a portion of a vehicle transportation network including candidate docking locations in accordance with this disclosure.

FIG. 22 is a diagram of another portion of a vehicle transportation network including candidate docking locations in accordance with this disclosure. In some embodiments, the pedestrian transportation network information may identify one or more portions of the pedestrian transportation network that are concurrent with one or more navigable, partially navigable, or unnavigable areas of the vehicle transportation network. For example, FIG. 22 includes a parking areas 22000/22002, roads 22100/22102/22104, and a building 22200, each of which includes pedestrian navigable areas. Entrance locations, which may be defined entrance locations, or predicted entrance locations, are shown as white diamonds. One or more docking locations for the building 22200 may be identified as described above. FIG. 22 includes a first selected area indicator 22300 and a second selected area indicator 22310. The selected area indictors 22300/22310 may represent passenger input selecting areas within the vehicle transportation network and are shown as broken line circles.

Figure 23:
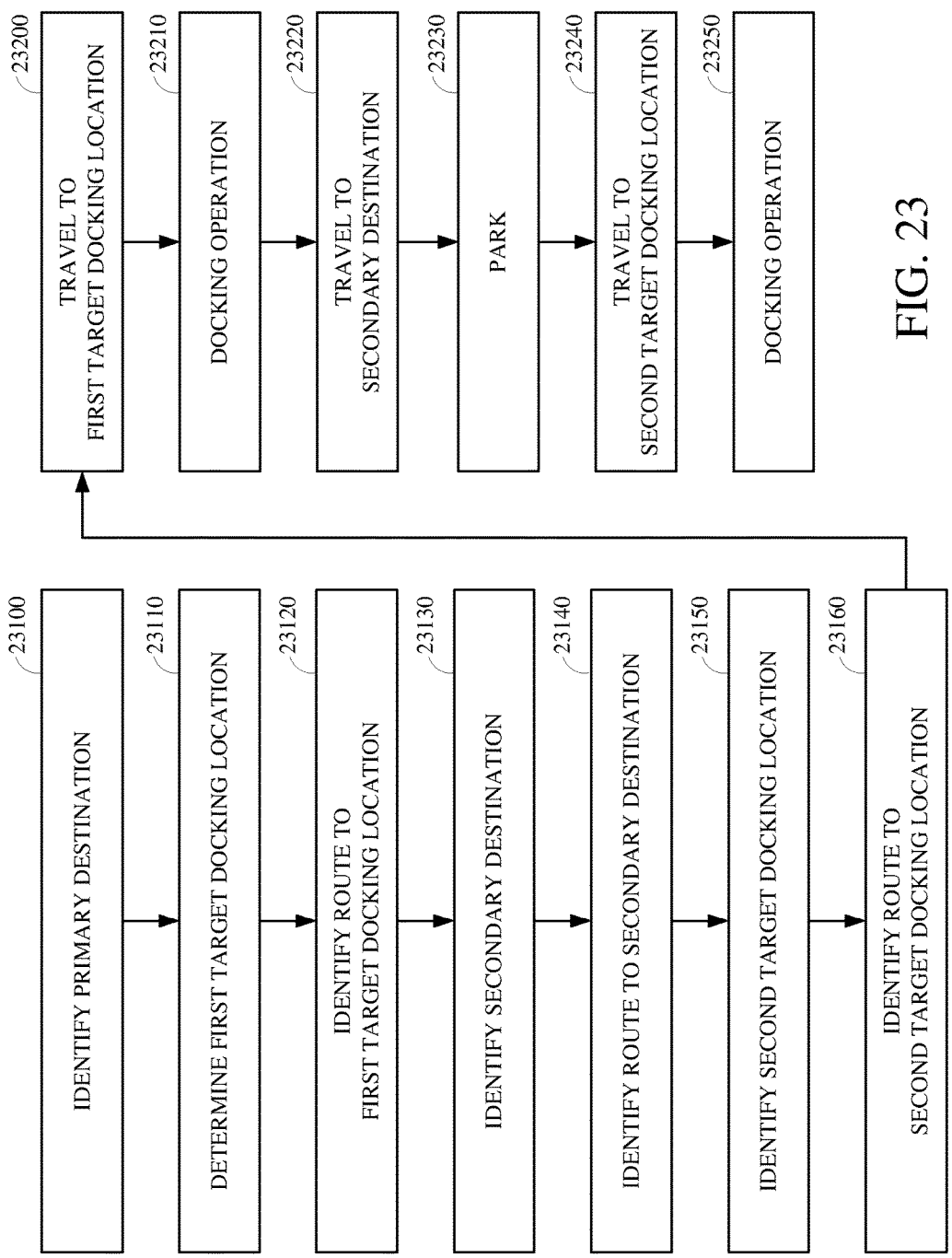
FIG. 23 is a diagram of a method of autonomous vehicle navigation and routing using multiple docking locations in accordance with this disclosure.

FIG. 23 is a diagram of a method of autonomous vehicle navigation and routing using multiple docking locations in accordance with this disclosure. Autonomous vehicle navigation and routing using multiple docking locations may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle navigation and routing using multiple docking locations. In some embodiments, autonomous vehicle navigation and routing using multiple docking locations may be similar to the autonomous vehicle navigation and routing shown in FIG. 6, with the addition or modification of certain features described herein.

In some embodiments, autonomous vehicle navigation and routing using multiple docking locations may include identifying a primary destination at 23100, determining a first target docking location at 23110, identifying a route to the first target docking location at 23120, identifying a secondary destination at 23130, identifying a route to the secondary destination at 23140, identifying a second target docking location at 23150, identifying a route to the second target docking location at 23160, traveling to the first target docking location at 23200, performing a docking operation at 23210, traveling to the secondary destination at 23220, parking at 23230, traveling to the second target docking location at 23240, performing a second docking operation at 23250, or a combination thereof.

In some embodiments, passenger docking location identification may include identifying a sequence of target docking locations. For example, the building 222000 shown in FIG. 22 may be a mall or a movie theater, a passenger of the autonomous vehicle may select the mall as a destination, the autonomous vehicle may identify an entrance location of the mall, such as an entrance location near the right side, as a first target docking location, which may be used as a drop-off location, and may identify another entrance location, such as an entrance location near the top left corner, as a second target docking location, which may be used as a pick-up location. In some embodiments, the autonomous vehicle may identify a pedestrian travel route between the first target docking location and the secondary docking location.

In some embodiments, a primary destination may be identified at 23100. Identifying the primary destination may include identifying vehicle transportation network information as shown in FIG. 6. Identifying a primary destination may include identifying a defined destination location indicated in the vehicle transportation network information for the destination, such as a street address, a postal address, a vehicle transportation network address, or a GPS address. For example, the primary destination may be identified based on input, such as user input selecting the primary destination.

Figure 24:
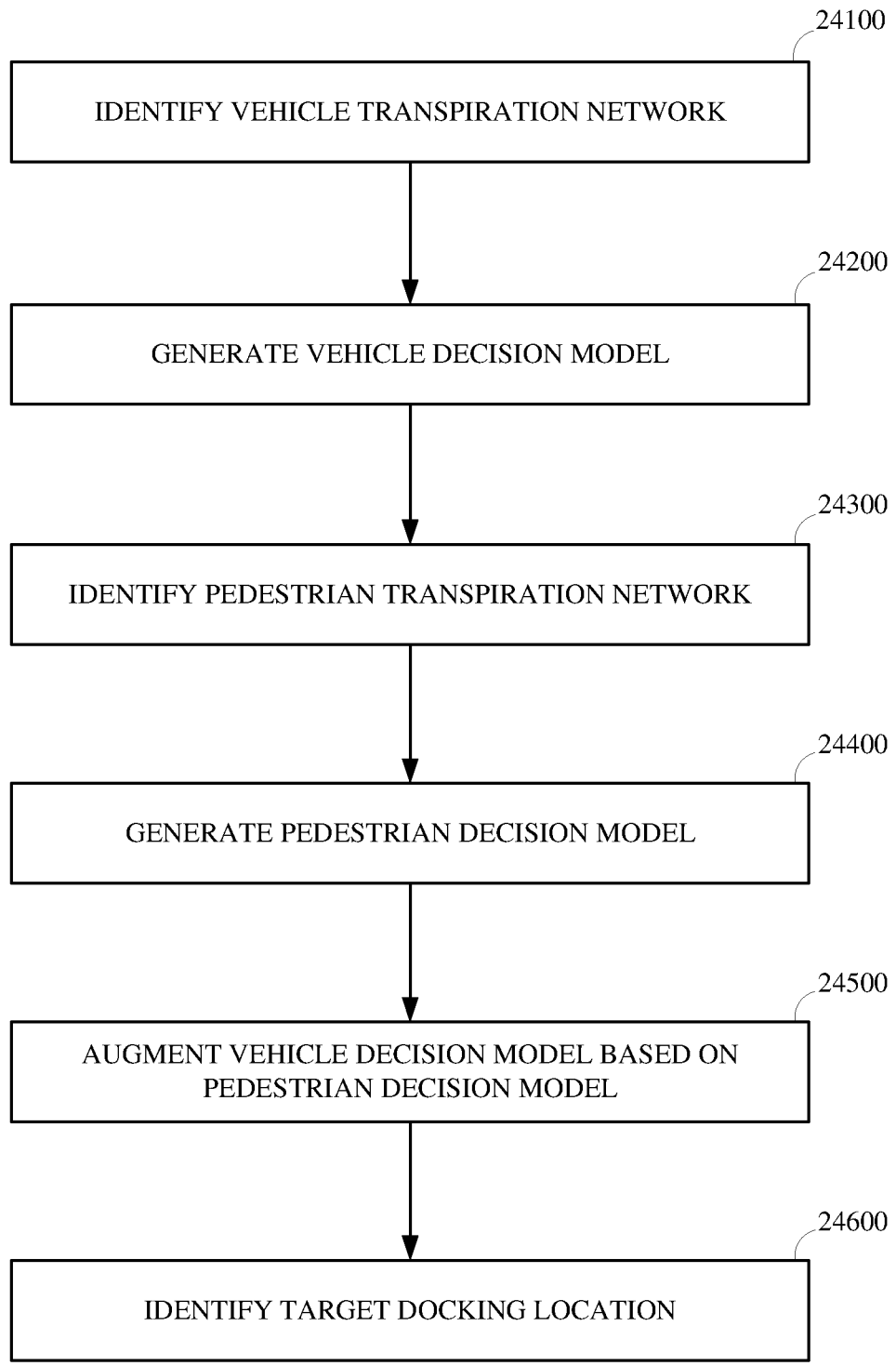
FIG. 24 is a diagram of a method of augmented passenger docking location identification in accordance with this disclosure.

In some embodiments, a first target docking location may be determined at 23110 based on the primary destination identified at 23100. For example, the first target docking location, which may be used as a drop-off or unloading location, may be identified as shown in FIG. 6. In some embodiments, the primary destination may be associated with multiple entrance locations, multiple docking locations, or both, and identifying the first target docking location may include generating one or more candidate routes for each of the docking locations associated with each of the entrance locations for the primary destination. In some embodiments, generating a candidate route may be similar to the routing shown in FIG. 6. In some embodiments, generating a candidate route may include using a combination of vehicle routing and pedestrian routing as shown in FIG. 24. In some implementations, the autonomous vehicle may automatically identify the entrance location, the first target docking location, or both. In some implementations, an entrance location, the first target docking location, or both may be identified based on input, such as passenger input selecting the entrance location, the first target docking location, or both.

In some embodiments, a route to the first target docking location may be identified at 23120. For example, a route may be selected from the candidate routes generated at 23110. In some embodiments, identifying the route to the first target docking location may be similar to identifying a route as shown in FIG. 6.

In some embodiments, a secondary destination, which may be a parking area for the primary destination, may be identified at 23130. For example, a primary destination, such as the building 22200 shown in FIG. 22, may be associated with one or more parking areas, such as the parking areas 22000/22002 shown in FIG. 22, which may be identified as the secondary destination. In some embodiments, the secondary destination may be identified based on the first target docking location identified at 23110. In some embodiments, the secondary destination may be identified based on the second target docking location identified at 23150.

In some embodiments, a route from the first target docking location to the secondary destination may be generated at 23140. Generating the route from the first target docking location to the secondary destination may be similar to the routing shown in FIG. 6.

A second target docking location, which may be used for performing a pick-up or loading operation, may be identified at 23150. In some implementations, the autonomous vehicle may automatically identify the entrance location, the second target docking location, or both. In some implementations, an entrance location, the second target docking location, or both may be identified based on input, such as passenger input selecting the entrance location, the second target docking location, or both.

In some embodiments, a route from the secondary destination to the second target docking location may be generated at 23160. Generating the route from the secondary destination to the second target docking location may be similar to the routing shown in FIG. 6.

Although not shown separately in FIG. 23, in some embodiments, one or more pedestrian routes from the first target docking location to the second target docking location may be generated and may be presented to a passenger.

In some embodiments, the autonomous vehicle may travel from the origin to the first target docking location at 23200 using the route identified at 23120. Traveling from the origin to the first target docking location may be similar to the traveling shown in FIG. 6.

In some embodiments, the autonomous vehicle may perform a docking operation at 23210. For example, the autonomous vehicle may stop at the first target docking location and one or more passengers may exit the autonomous vehicle. The autonomous vehicle may travel from the first target docking location to the secondary destination at 23220 and may park at the secondary destination at 23230. In some embodiments, the autonomous vehicle may travel from the secondary destination to the second target docking location at 23240 and may perform a second docking operation, at the second target docking location, at 23250. For example, the autonomous vehicle may stop at the second target docking location and one or more passengers may enter the autonomous vehicle.

FIG. 24 is a diagram of a method of augmented passenger docking location identification in accordance with this disclosure. Augmented passenger docking location identification may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform augmented passenger docking location identification. In some embodiments, augmented passenger docking location identification may be similar to the docking location identification shown in FIG. 6, with the addition or modification of certain features described herein.

In some embodiments, augmented passenger docking location identification may include identifying vehicle transportation network information at 24100, generating a vehicle decision model at 24200, identifying pedestrian transportation network information at 24300, generating a pedestrian decision model at 24400, augmenting the vehicle decision model based on the pedestrian decision model at 24500, determining a target docking location at 24600, or a combination thereof.

In some embodiments, vehicle transportation network information, such as the vehicle transportation network information shown in FIGS. 3-5/10-12/17-19/22, may be identified at 24100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, the vehicle transportation network information may include docking location information representing one or more docking locations within the vehicle transportation network.

In some embodiments, a vehicle decision model may be generated at 24200. Generating the vehicle decision model may include identifying a primary destination, which may be similar to identifying a destination as shown in FIG. 6 or FIG. 23. Identifying a primary destination may include identifying a point of interest, such as the unnavigable area (building) 3100 shown in FIG. 3, the unnavigable area (building) 4100 shown in FIG. 4, a unnavigable area (building) 5100 shown in FIG. 5, or the building 22200 shown in FIG. 22, as the primary destination.

In some embodiments, generating the vehicle decision model may be similar to the route generation shown in FIG. 6, with the addition or modification of certain features described herein. The autonomous vehicle may generate the vehicle decision model for routing between an origin and each of the docking locations associated with the primary destination using the vehicle transportation network information. The vehicle decision model may include one or more candidate routes between the origin and each of the docking locations associated with the primary destination.

In some embodiments, pedestrian transportation network information may be identified at 24300. Identifying the pedestrian transportation network information may be similar to identifying the vehicle transportation network information at 24100. The pedestrian transportation network information may represent an area in proximity to the primary destination. In some embodiments, the area included in the pedestrian transportation network information may be identified based on a defined metric, such as a maximum pedestrian travel time, which may be determined, for example, based on user input. In some embodiments, the pedestrian transportation network information may include entrance location information, docking location information, or both for the primary destination. In some embodiments, identifying the vehicle transportation network information at 24100 and identifying the pedestrian transportation network information at 24300 may be combined.

In some embodiments, a pedestrian decision model may be generated at 24200. For example, the autonomous vehicle may generate a second decision model for pedestrian routing between each of the docking locations associated with the primary destination and the corresponding entrance locations using the pedestrian transportation network information. Generating the pedestrian decision model may be similar to generating the vehicle decision model at 22200, except that the pedestrian decision model may be generated based on the pedestrian transportation network information, and may include one or more candidate routes between each docking location associated with the primary destination and each entrance location associated with the primary destination, and may be based on metrics identified for pedestrian routing.

In some embodiments, the autonomous vehicle may generate one or more candidate pedestrian routes between each entrance location identified for the primary destination and each routing state in the pedestrian decision model. The autonomous vehicle may generate an expected cost, which may be based on pedestrian travel time, for each routing state in the pedestrian decision model. In some embodiments, generating the pedestrian decision model may include determining an optimal route, which may be similar to the route optimization shown in FIG. 6, between each entrance location identified for the primary destination and each routing state in the pedestrian decision model. For example, the pedestrian route optimization may include using an all-pair shortest path algorithm.

In some embodiments, at 24500, the vehicle decision model generated at 24200 may be augmented based on the pedestrian decision model generated at 24400. Augmenting the vehicle decision model with the pedestrian decision model may include combining the routing states, actions, and expected costs from the vehicle decision model with the routing states, docking operation actions, and corresponding expected costs from the pedestrian decision model.

In some embodiments, a target docking location may be identified at 24600 based on the augmented decision model generated at 24500. In some embodiments, identifying the target docking location may include generating one or more routes, such as an optimal route, from the target docking location to an entrance location for the primary destination. In some embodiments, identifying the target docking location may include identifying a target docking location for to the primary destination within the vehicle transportation network based on the augmented decision model generated at 24500.

For example, a building, such as the building 22200 shown in FIG. 22, may be identified as the primary destination, an entrance location for the primary destination, such as one of the predicted entranced locations at the top right of the building 22200 as shown in FIG. 22, may be identified as the entrance location for the primary destination, and a target docking location, which may correspond with a docking location cluster median for a docking location cluster identified based on the candidate docking locations shown in the road 22100 in FIG. 22, may be identified based on the entrance location.

In some embodiments, the autonomous vehicle may identify the entrance location, the target docking location, or both, based on one or more metrics. For example, the autonomous vehicle may identify the target docking location based on minimizing the total travel costs, which may include expected vehicle travel costs, such as expected vehicle travel time, and expected pedestrian travel costs, such as expected pedestrian travel time.

In some embodiments, the entrance location, the target docking location, or both may be identified based on input, such as passenger input. For example, a passenger may select a defined entrance or a predicted entrance. In another example, a passenger may select a target docking location. In another example, a passenger may identify an area that includes multiple entrances, multiple docking locations, or both, such as the selected area 22300 or the selected area 22310 shown in FIG. 22, and the autonomous vehicle may identify a target docking location in the selected area.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An autonomous vehicle comprising:
a processor configured to execute instructions stored on a non-transitory computer readable medium to:
identify map information representing a vehicle transportation network, the vehicle transportation network including a primary destination and a docking location, wherein identifying the map information includes identifying the map information such that the map information includes docking location information representing the docking location;
identify the docking location as a target docking location for the primary destination based on the map information; and
generate, based on the map information, route information representing a route for the autonomous vehicle to traverse the vehicle transportation network from an origin in the vehicle transportation network to the target docking location; and
a trajectory controller configured to operate the autonomous vehicle in accordance with the route information such that the autonomous vehicle traverses the vehicle transportation network from the origin to the target docking location.

2. The autonomous vehicle of claim 1, wherein the processor is configured to, in response to performing a docking operation at the target docking location, execute instructions stored on the non-transitory computer readable medium to:
identify, based on the map information, information representing a secondary destination in the vehicle transportation network, wherein the secondary destination is a parking area associated with the primary destination; and
generate, based on the map information, subsequent route information representing a subsequent route for the autonomous vehicle to traverse the vehicle transportation network from the target docking location to the secondary destination.

3. The autonomous vehicle of claim 2, wherein the trajectory controller is configured to:
operate the autonomous vehicle in accordance with the subsequent route information such that the autonomous vehicle traverses the vehicle transportation network from the target docking location to the secondary destination; and
operate the autonomous vehicle to park at the secondary destination.

4. The autonomous vehicle of claim 1, wherein the processor is configured to execute instructions stored on the non-transitory computer readable medium to identify the map information such that the docking location information is based on operating information for a plurality of vehicles, wherein the operating information includes a plurality of operations, wherein each operation from the plurality of operations is associated with a respective vehicle from the plurality of vehicles.

5. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that a stationary period associated with the operation exceeds a minimum docking duration.

6. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that a maximum docking duration exceeds a stationary period associated with the operation.

7. The autonomous vehicle of claim 4, wherein the operating information associated with a respective vehicle from the plurality of vehicles includes a plurality of event indicators representing a sequence of events for the vehicle, wherein an operation from the plurality of operations includes a plurality of events from the sequence of events, wherein the plurality of events includes a stop event and a subsequent start event, and wherein a stationary period associated with the operation indicates a temporal difference between the start event and the stop event.

8. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that the operating information includes a vehicle type indicator for the vehicle associated with the operation, wherein the vehicle type indicator indicates that the vehicle is a fleet vehicle.

9. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that the operating information includes a vehicle operating type indicator for the vehicle associated with the operation, wherein the vehicle operating type indicator indicates that the vehicle is operating as a low occupancy carrier vehicle.

10. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that the operating information for the vehicle associated with the operation indicates a change in occupancy of the vehicle during a stationary period associated with the operation.

11. The autonomous vehicle of claim 10, wherein the change in occupancy is detected based on a signal from a seat occupant sensor of the vehicle.

12. The autonomous vehicle of claim 4, wherein identifying the map information such that the map information includes docking location information representing the docking location includes determining the docking location information based on the operating information by filtering the operating information, wherein filtering the operating information includes identifying an operation from the plurality of operations as a candidate docking operation on a condition that the operating information for the vehicle associated with the operation indicates a passenger door open event during a stationary period associated with the operation.

13. The autonomous vehicle of claim 4, wherein identifying the map information such that the map information includes docking location information representing the docking location includes determining the docking location information based on the operating information by filtering the operating information, wherein filtering the operating information includes:
   identifying an operation from the plurality of operations;
   identifying a location associated with the operation;
   identifying map information corresponding to the location;
   determining whether the location is docking eligible based on the map information; and
   identifying the operation as a candidate docking operation on a condition that the location is docking eligible.

14. The autonomous vehicle of claim 13, wherein determining whether the location is docking eligible includes:
   determining that the location is docking eligible on a condition that the map information indicates that the location is immediately adjacent to a pedestrian walkway;
   determining that the location is docking ineligible on a condition that the map information indicates that stopping or loading are prohibited for the location; and
   determining that the location is docking eligible on a condition that the map indicates that a spatial difference between the location and an intersection exceeds an intersection docking buffer distance.

15. An autonomous vehicle comprising:
   a processor configured to execute instructions stored on a non-transitory computer readable medium to:
      identify map information representing a vehicle transportation network, the vehicle transportation network including a primary destination and a docking location, wherein identifying the map information includes identifying the map information such that the map information includes docking location information representing the docking location, wherein the docking location information is based on operating information for a plurality of vehicles, wherein the operating information includes a plurality of operations, wherein each operation from the plurality of operations is associated with a respective vehicle from the plurality of vehicles, wherein the docking location information is determined based on the operating information by filtering the operating information, wherein filtering the operating information includes identifying an operation from the plurality of operations as a candidate docking operation on a condition that a stationary period associated with the operation exceeds a minimum docking duration and a maximum docking duration exceeds the stationary period;
      identify the docking location as a target docking location for the primary destination based on the map information; and
      generate, based on the map information, route information representing a route for the autonomous vehicle to traverse the vehicle transportation network from an origin in the vehicle transportation network to the target docking location; and
   a trajectory controller configured to operate the autonomous vehicle in accordance with the route information such that the autonomous vehicle traverses the vehicle transportation network from the origin to the target docking location.

16. The autonomous vehicle of claim 15, wherein the processor is configured to, in response to performing a docking operation at the target docking location, execute instructions stored on the non-transitory computer readable medium to:

identify, based on the map information, information representing a secondary destination in the vehicle transportation network, wherein the secondary destination is a parking area associated with the primary destination; and generate, based on the map information, subsequent route information representing a subsequent route for the autonomous vehicle to traverse the vehicle transportation network from the target docking location to the secondary destination.

17. The autonomous vehicle of claim 16, wherein the trajectory controller is configured to:

operate the autonomous vehicle in accordance with the subsequent route information such that the autonomous vehicle traverses the vehicle transportation network from the target docking location to the secondary destination; and operate the autonomous vehicle to park at the secondary destination.

18. The autonomous vehicle of claim 15, wherein the operating information associated with a respective vehicle from the plurality of vehicles includes a plurality of event indicators representing a sequence of events for the vehicle, and wherein an operation from the plurality of operations includes a plurality of events from the sequence of events, wherein the plurality of events includes a stop event and a subsequent start event, and wherein the stationary period associated with the operation indicates a temporal difference between the start event and the stop event.

19. The autonomous vehicle of claim 15, wherein filtering the operating information includes:

identifying an operation from the plurality of operations as a candidate docking operation on a condition that:
the operating information for the vehicle associated with the operation includes one or more of:
vehicle type information indicating that the vehicle is a fleet vehicle;
vehicle operating type information indicating that the vehicle is operating as a low occupancy carrier vehicle;
occupancy change information indicating a change in occupancy of the vehicle during the stationary period associated with the operation, wherein the change in occupancy is detected based on a signal from a seat occupant sensor of the vehicle; or
door event information indicating a passenger door open event during the stationary period associated with the operation; and
a location associated with the operation is docking eligible, wherein identifying the operation as a candidate docking operation includes determining whether the location is docking eligible by:
identifying map information corresponding to the location;
determining that the location is docking eligible on a condition that the map information indicates that the location is immediately adjacent to a pedestrian walkway;
determining that the location is docking ineligible on a condition that the map information indicates that stopping or loading are prohibited for the location; and
determining that the location is docking eligible on a condition that the map information indicates that a spatial difference between the location and an intersection exceeds an intersection docking buffer distance.

20. An autonomous vehicle comprising:

a processor configured to execute instructions stored on a non-transitory computer readable medium to:

identify map information representing a vehicle transportation network, the vehicle transportation network including a primary destination and a first docking location, wherein identifying the map information includes identifying the map information such that the map information includes docking location information representing the first docking location;

identify the first docking location as a target docking location for the primary destination based on the map information;

generate, based on the map information, first route information representing a first route for the autonomous vehicle to traverse the vehicle transportation network from an origin in the vehicle transportation network to the target docking location;

identify, based on the map information, information representing a secondary destination in the vehicle transportation network, wherein the secondary destination is a parking area associated with the primary destination; and generate, based on the map information, second route information representing a second route for the autonomous vehicle to traverse the vehicle transportation network from the target docking location to the secondary destination; and a trajectory controller configured to:

operate the autonomous vehicle in accordance with the first route information such that the autonomous vehicle traverses the vehicle transportation network from the origin to the target docking location;

in response to the autonomous vehicle arriving at the target docking location, operate the autonomous vehicle such that the autonomous vehicle performs a docking operation at the target docking location; and in response to performing the docking operation at the target docking location, operate the autonomous vehicle in accordance with the second route information such that the autonomous vehicle traverses the vehicle transportation network from the target docking location to the secondary destination and parks at the secondary destination.

\* \* \* \* \*